(12) United States Patent
Ziolkowski et al.

(10) Patent No.: US 12,190,106 B2
(45) Date of Patent: *Jan. 7, 2025

(54) AUDITABLE AUTHORSHIP ATTRIBUTION WITH AUTOMATICALLY APPLIED AUTHORSHIP TOKENS

(71) Applicant: U.S. Bank National Association, Minneapolis, MN (US)

(72) Inventors: Christopher Ziolkowski, Burnsville, MN (US); Valerie Lancelle, Caledonia, WI (US); Christopher Davis, Minneapolis, MN (US)

(73) Assignee: U.S. BANK NATIONAL ASSOCIATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,113

(22) Filed: Jun. 24, 2024

(65) Prior Publication Data

US 2024/0345837 A1    Oct. 17, 2024

Related U.S. Application Data

(63) Continuation of application No. 18/597,744, filed on Mar. 6, 2024, now Pat. No. 12,061,902.

(60) Provisional application No. 63/625,601, filed on Jan. 26, 2024.

(51) Int. Cl.
  *G06F 8/73*    (2018.01)
(52) U.S. Cl.
  CPC .................................... *G06F 8/73* (2013.01)

(58) Field of Classification Search
  CPC ............ G06F 40/169; G06F 8/65; G06F 8/73; G06N 20/20
  See application file for complete search history.

(56) References Cited

U.S. PATENT DOCUMENTS

| 6,275,223 | B1 | 8/2001 | Hughes |
| 2003/0131313 | A1 | 7/2003 | Flanagan |
| 2004/0085354 | A1 | 5/2004 | Massand |
| 2008/0086718 | A1 | 4/2008 | Bostick et al. |
| 2011/0279228 | A1 | 11/2011 | Kumar |
| 2012/0077176 | A1 | 3/2012 | Foster et al. |
| 2014/0053135 | A1 | 2/2014 | Bird et al. |
| 2015/0052427 | A1 | 2/2015 | Vagell et al. |
| 2016/0034273 | A1 | 2/2016 | Leupold et al. |
| 2016/0344828 | A1 | 11/2016 | Husler et al. |

(Continued)

OTHER PUBLICATIONS

Song et al. "A Survey of Automatic Generation of Source Code Comments: Algorithms and Techniques", pp. 111411-111428, [Online—Retrieved from Internet on Aug. 24, 2024], <https://ieeexplore.ieee.org/stamp/stamp.jsp?tp=&arnumber=8778714>, (Year: 2019).*

(Continued)

*Primary Examiner* — Ziaul A Chowdhury
(74) *Attorney, Agent, or Firm* — Merchant & Gould, P.C.

(57) ABSTRACT

A text editor or a plugin thereto automatically generates authorship tokens to identify content authored by a human author or an artificial author. The authorship tokens are applied to the work while the work is being produced. Thus, subsequent review of the work can identify regions produced by a human author and other regions produced by an artificial intelligence.

19 Claims, 16 Drawing Sheets

(56) References Cited

U.S. PATENT DOCUMENTS

| | | | | |
|---|---|---|---|---|
| 2018/0307480 | A1* | 10/2018 | Doyle | G06F 8/658 |
| 2020/0183818 | A1 | 6/2020 | Guenther et al. | |
| 2022/0138266 | A1* | 5/2022 | Wang | G06N 3/044 707/722 |
| 2023/0333821 | A1 | 10/2023 | Cosgrove et al. | |
| 2024/0184566 | A1* | 6/2024 | Gabel | G06F 8/70 |

OTHER PUBLICATIONS

Wittenberg, Chloe et al., Labeling AI—Generated Content: Promises, Perils, and Future Directions (Topical Policy Brief), MIT Schwarzman College of Computing, Nov. 28, 2023; 16 Pages.

Best practices for writing code comments—Stack Overflow—Dec. 23, 2021, 21 Pages.

Coding and Comment Style: Broad Institute of MIT and Harvard; Jan. 19, 2024; 11 Pages.

Harding, William—GitClear—Coding on Copilot—2023 Data Shows Downward Pressure on Code Quality (150 m lines of analyzed code + projections for 2024); Jan. 16, 2024; 24 Pages.

Califa, Joel—Commit together with co-authors—The GitHub Blog; Jan. 29, 2018;6 Pages.

Copyright Registration Guidance: Works Containing Material Generated by Artificial Intelligence; Federal Register/vol. 88, No. 51/Thursday, Mar. 16, 2023/Rules and Regulations; 5 Pages.

GitClear—A visual guide to Diff Delta—And how fusing commits together reduces tech debt & code review time; 2021; 26 Pages.

Find out who is leaking your secrets with help from invisible zero-width characters (Home/Blog)—Posted on Apr. 5, 2018; 2 Pages.

Git blame—ATLASSIAN—Software Development (Tutorial); Jan. 19, 2024, 10 Pages.

GitHub Desktop—Simple collaboration from your desktop (Overview/Release Notes/Help); https://desktop.github.com; Printed Feb. 21, 2024; 4 Pages.

GNU Global Source Code Tag System (Edition 6.6.11, for GNU Global version 6.6.11; Published by Tama Communications Corporation (Tokyo, Japan); Nov. 20, 2023; 75 Pages.

Day, Lewis; HACKADAY—How Do You Prove an AI Didn't Make Your Art?—https://hackaday.com; Nov. 27, 2023; 39 Pages.

Antony M; How to Prove I was Falsely Accused of Using AI in my Paper; Medium; Jan. 15, 2023; 13 Pages.

Inventorship Guidance for AI-Assisted Inventions; Department of Commerce; Patent and Trademark Office; Federal Register/vol. 89, No. 30/Tuesday, Feb. 13, 2024; 9 Pages.

Vogel, Peter; No Comment: Why Commenting Code Is Still a Bad Idea (Practical.net); Jul. 31, 2013; 10 Pages.

Black, Jessica; 5 Ways to Reduce GitHub Copilot Security and Legal Risks—FOSSA (https://fossa.com/); Printed Feb. 29, 2024; 6 Pages.

Alemohammad, Sina et al.; Self-Consuming Generative Models Go MAD; Jul. 4, 2023; 31 Pages.

Steganography (definition); Wikipedia (The Free Encyclopedia); Printed Jan. 19, 2024; 11 Pages.

Tag based programming—Software Engineering Stack Exchange; Printed Feb. 29, 2024; 3 Pages.

Martin, Jeff; The Challenges for License Compliance and Copyright with AI—Mend.io; Dec. 21, 2023; 3 Pages.

Santos, Omar et al.; Toward Trustworthy AI: An Analysis of Artificial Intelligence (AI) Bill of Materials (AI BOMS); ResearchGate; Oct. 2023; 7 Pages.

Wyatt, Eric; Typing Insights (Tips.Net); Apr. 22, 2019; 4 Pages.

United States Copyright Office (Library of Congress); Review/Authorship work titled 'Zarya of the Dawn'; Feb. 23, 2023; 29 Pages.

Roush, Allen et al., Most Language Models can be Poets too: An AI Writing Assistant and Constrained Text Generation Studio, Oracle Corporation, Last Accessed Apr. 23, 2024, 7 Pages.

Blake, Alex, This app just got me excited for the future of AI on Macs; https://www.digitaltrends.com/computing/ia-writer-7-chatgpt-dialog-partner/; Dated Dec. 4, 2023; 10 Pages.

Embeddings—Learn how to turn text into numbers, unlocking use cases like search—OpenAI API; https://platform.openai.com/docs/guides/embeddings; Dated Apr. 11, 2024; 15 Pages.

IA Writer 7 (Previous—5 Minutes Read—Next); https://ia.net/topics/ia-writer-7; Dated Nov. 30, 2023, 10 Pages.

IA WRITER 7: Whoa, Feedback! (Previous—6 Minutes Read—Next); https://ia.net/topics/ia-writer-7-whoa-feedback; Dated Dec. 8, 2023; 8 Pages.

GitHub—iainc/Markdown—Annotations (Markdown Annotations embed authorship in text while preserving its readability and portability); https://github.com/iainc/Markdown-Annotations; Dated Apr. 15, 2024; 4 Pages.

GitHub—iainc/Markdown—Annotations (Gracefully hid annotation blocks in comments #1); https://github.com/iainc/Markdown-Annotations/issues/1; Dated Apr. 15, 2024; 4 Pages.

GitHub—iainc/Markdown—Annotations (An alternate perspective, if looking for feedback #2); https://github.com/iainc/Markdown-Annotations/issues/2; Dated Apr. 15, 2024; 3 Pages.

GitHub—iainc/Markdown—Annotations (Project name & name of hash annotation key is potentially misleading #3); https://github.com/iainc/Markdown-Annotations/issues/3; Dated Apr. 15, 2024; 2 Pages.

GitHub—iainc/Markdown—Annotations (Hand-editing is problematic #4) https://github.com/iainc/Mardown-Annotations/issues/4; Dated Apr. 15, 2024; 2 Pages.

GitHub—iainc/Markdown—Annotations (YAML front matter #5); https://github.com/iainc/Markdown-Annotations/issues/5; Dated Apr. 15, 2024; 2 Pages.

IA Writer 7/Hacker News (new/past/comments/ask/show/jobs/submit); https://news.ycombinator.com/item?id=38476552; Dated Apr. 15, 2024; 1 Page.

IA Writer 7/Hacker News (new/past/comments/ask/show/jobs/submit); https://news.ycombinator.com/item?id=38487950; Dated Apr. 15, 2024; 1 Page.

No AI Feature (Previous—7 Minutes Read—Next); https://ia.net/topics/no-feature; Dated Nov. 22, 2023; 10 Pages.

The Verge (Tech/Apps/Artificial Intelligence)—iA Writer can now track what you or ChatGPT wrote—The Verge; https://www.theverge.com/2023/12/1/23983835/ia-writer-generative-ai-authorship; Dated Dec. 1, 2023; 5 Pages.

The Verge (ia Comments); https://www.theverge.com/2023/12/1/23983835/ia-writer-generative-ai-authorship?showComments=1; Dated Dec. 1, 2023; 5 Pages.

Writing With AI (Previous—10 Minutes Read—Next); https://ia.net/topics/writing-with-ai; Dated Nov. 28, 2023; 16 Pages.

Levenshtein Distance (Online calculator: Levenshtein Distance); https://planetcalc.com/1721/; Dated Apr. 18, 2024; 8 Pages.

Ango, Steph, Photoshop for text (The Wayback Machine); https://web.archive.org/web/20231028235855—https://stephango.com/photoshop-for-text; Dated Oct. 18, 2022; 3 Pages.

* cited by examiner

Determining that an edit
to content has been made 210

Receiving modification over
human interface device 212

Determining whether the edit is
characteristic of a manual or artificial edit 214

Determining whether
generative artificial intelligence is active 216

FIG. 2B

Determining that the edit satisfies
a threshold of significance 220

Determining a number of or percentage
of units of content have changed 222

Determining whether the change is
functional or cosmetic 224

Determining a significance score 226

Accounting for the generative
artificial intelligence's prompt 228

FIG. 2C

```
┌─────────────────────────────────────────────────┐
│         Providing authorship token              │
│      in association with the region 240         │
│                                                 │
│   ┌─────────────────────────────────────────┐   │
│   │  Including a portion of a creative work 242 │
│   └─────────────────────────────────────────┘   │
│                                                 │
│   ┌─────────────────────────────────────────┐   │
│   │   Including features to resist mimicry 244 │
│   └─────────────────────────────────────────┘   │
│                                                 │
│   ┌─────────────────────────────────────────┐   │
│   │      Modifying additional regions 246   │   │
│   └─────────────────────────────────────────┘   │
│                                                 │
│   ┌─────────────────────────────────────────┐   │
│   │       Adding the authorship token       │   │
│   │        into a separate file 248         │   │
│   └─────────────────────────────────────────┘   │
└─────────────────────────────────────────────────┘
```

FIG. 2D

Authorship Token Instructions 110

- Hiding the authorship token 250
- Committing the content 252
- Generating generated content using artificial intelligence 254
- Determining whether to remove an existing authorship token 256
- Identifying regions having or lacking authorship tokens 258
- Taking action based thereon 260
- Determining that a region associated with a second manual edit is already associated with a human authorship token 262
- Saving the file 264

FIG. 2E

AUDITABLE AUTHORSHIP ATTRIBUTION WITH AUTOMATICALLY APPLIED AUTHORSHIP TOKENS

CROSS REFERENCE TO RELATED APPLICATIONS

This application claims the benefit of priority to U.S. patent application Ser. No. 18/597,744, filed on Mar. 6, 2024, which claims priority from U.S. Provisional Patent Application No. 63/625,601, filed Jan. 26, 2024, the entire disclosures of which are incorporated by reference herein in their entireties for any and all purposes.

BACKGROUND

Traditionally, text editing software relied on human input to produce content. Thus, content could be assumed to have human authorship. Indeed, to label something as "human authored" was unnecessary because of course it was. Eventually, relatively basic or repetitive content could be generated with the help of simple software run at the creative direction of a human user (e.g., automatic creation of tables of contents based on headers). Only very recently has artificial intelligence grown in capability sufficient to allow for the generation of useful human-like content with little or no input from a human author. Now, content produced using text editing software can have a human author, an algorithmic author, or even a combination thereof. Given the quality of content produced by generative artificial intelligence, it can be difficult, if not impossible, to separate human-generated content from artificially generated content.

BRIEF DESCRIPTION OF THE DRAWINGS

FIG. 2, which is split into FIGS. 2A-F, illustrates an example method implementing techniques described herein.

FIG. 7, which is split into

DETAILED DESCRIPTION

Figure 1:
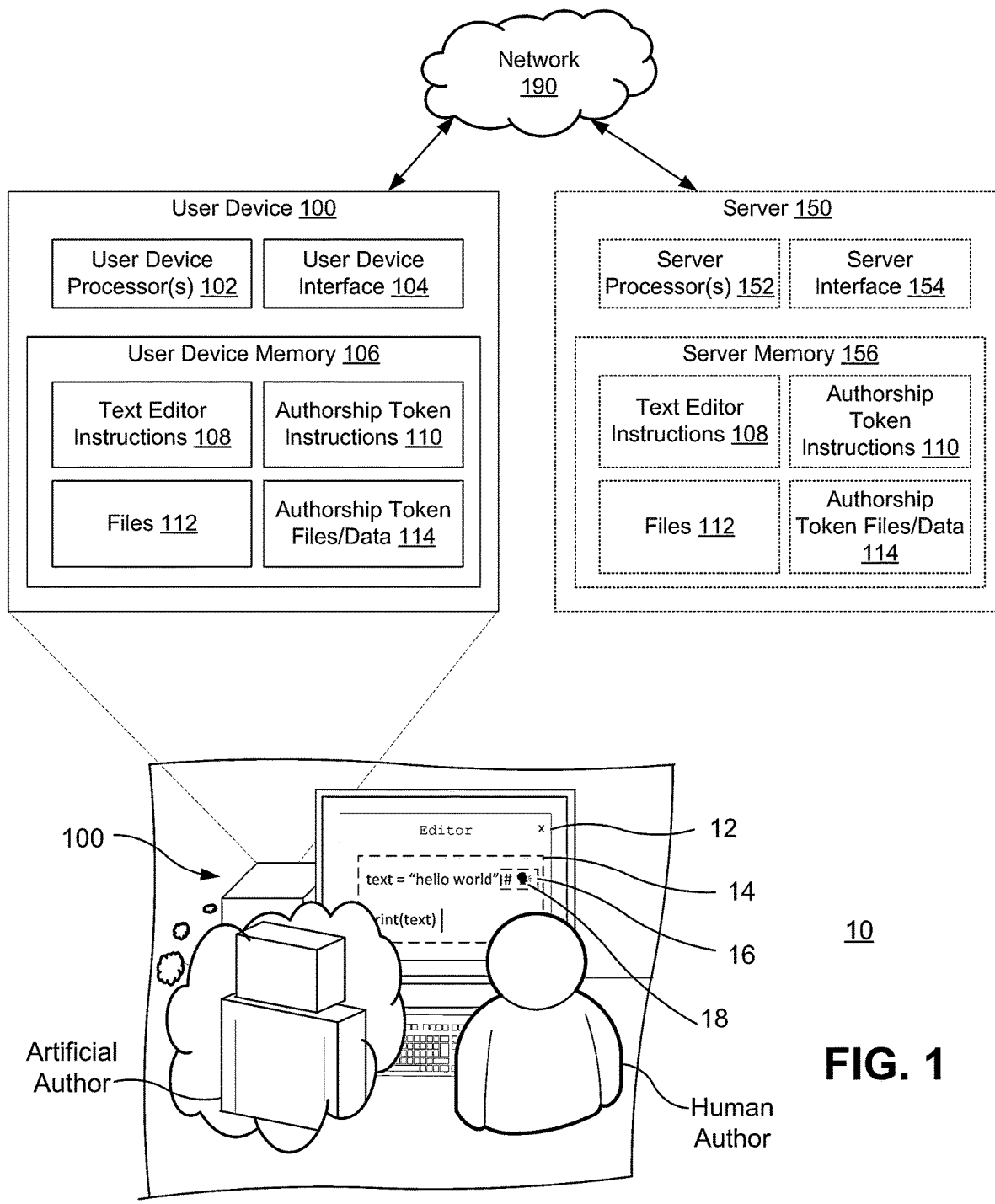
FIG. 1 illustrates an example system that can benefit from techniques described herein.

When content is produced through a collaboration between a human author and an artificial author like a generative artificial intelligence (e.g., GITHUB COPILOT or OFFICE COPILOT), it would be beneficial to be able to demonstrate which portions of the content are authored by a human and which portions of that content was produced by an artificial intelligence. For example, when training new generations of artificial intelligence, training material that is generated by a human is preferable to training material produced by an artificial intelligence because training an artificial intelligence on synthetic data can lead to an erosion of quality (see, e.g., Alemohammad et al., *Self-Consuming Generative* Models Go MAD, arXiv: 2307.01850v1, Jul. 4, 2023). Further, copyright offices have requested that applicants identify which portions of a work were created by an artificial intelligence so they can be excluded from the copyright claim (see, e.g., U.S. Copyright Office, *Copyright Registration Guidance: Works Containing Material Generated by Artificial Intelligence,* 88 Fed. Reg. 51, Mar. 16, 2023). But at the time of submission of a work to a copyright office or other use of a work, it can be difficult or impossible to look back at a work and identify what portions of the content were authored by a human and which were authored by an artificial intelligence. Further, there may be portions authored by a human in conjunction with an artificial intelligence (or vice versa). Further still, even where a work is produced solely by a human without artificial authorship, it can be difficult to practically demonstrate that the work really was authored by a human rather than an artificial intelligence.

Some traditional tools (e.g., document or code editing tools having collaboration features) can label content with an associated author, but such existing tools are insufficient for the problem of mixed human and artificially generated content at least because they treat all content as having been authored by the person associated with the account of the tool. For example, authorship in version control systems like GIT is typically automatically attributed on commit level, thereby attributing all content (or all new content) in the commit as having been authored by the account making the commit regardless of how the content being committed was created (e.g., via manual creation by a human or artificial creation by an artificial intelligence). That is, tools track the user account that committed or saved particular content but lack the ability to conveniently track the author of the underlying content being saved or committed. Such tools lack the ability to identify which portions of the code committed by the user were manually authored by the user, through the use of a generative artificial intelligence code generation feature (e.g., GITHUB COPILOT), by the user copying from another source (e.g., answers from STACK OVERFLOW or open-source libraries), or combinations thereof. Indeed, it was often unnecessary to do so because it was easy and largely accurate to assume that the person committing the code was the author of the code. But it is no longer safe to make that assumption.

As another example, some tools allow for the automatic creation of redline markup showing the author of specific portions of a document. But such redline markup is limited to identifying as the author of content the user account associated with the word processor, rather than the author that created the actual text content or how (e.g., whether as the result of manual human input, as the result of pasting from another source, or as the result of generating by an artificial intelligence). As artificial content generation features become more integrated into text editors, it becomes increasingly difficult to determine the provenance of content. Further, redline markup traditionally requires the content it is describing to be stored in a rich text format. For instance, many word processors or other office applications store content in Open Office XML file formats (e.g., as defined in ISO/IEC 29500-1:2016 or subsequent standards). However, such formatting is inappropriate for many kinds of files (e.g., source code, which is often stored in plain text), which traditionally lack the ability to usefully store such redline markup.

Merely automatically treating every piece of content added to a file as being authored by a human is insufficient because generative artificial intelligence often directly inserts content into the file into locations where the human would also insert text. Where it was previously safe to assume that only one author was operating a text editor at a time, now generative artificial intelligence is being integrated into text editors in such a way that a human author and an artificial author may take turns editing the same content within the same editing session. As a result, edits coming from a single text editor on a single computer can now come from a human author and at least one artificial author. As advancement in artificial intelligence continues to grow, where a text editor may now have only a single artificial coauthor, future text editors may have multiple different artificial authors available and distinguishing which among them contributed to which content (e.g., because of different capabilities, licensing requirements, copyright statuses, other differences, or combinations thereof) may be beneficial. Further, current artificial authors often require human involvement at some level of the process (e.g., copying and pasting content produced by an artificial author or accepting a provided change from an artificial author). Future implementations may involve an artificial author acting autonomously or semi-autonomously.

One could painstakingly, manually label which portions of a work were authored by the human or by the artificial intelligence, such a process can be time consuming and inefficient. Further, an individual could very easily forget to label sections, leading to a decrease in accuracy for the identifications. Further still, it may be difficult for authors themselves to apply a consistent standard for determining when they are the author of the content versus an artificial intelligence. Alternatively, a program could log every keystroke or input by an author and use the resulting log to demonstrate human authorship. But such a log would raise privacy concerns, consume large amount of processing and memory resources, and can be difficult to correlate to a resulting output. A user recording themselves producing content (e.g., using a screen capture program or even a camera) raises similar challenges.

Thus, there is a need in the art for technical solutions that conveniently identify and label content with an associated human or artificial author.

Techniques described herein are relevant to such technical solutions. Techniques described herein include the use of authorship tokens to identify content authored by a particular kind of author (e.g., human or artificial). Such tokens can automatically be generated by the content editor (or a plugin thereto) and applied to the work while the work is being produced. Thus, subsequent review of the work can identify regions produced by a human author and other regions that may have been produced by an artificial intelligence.

In a first example, any edit to a region of content is sufficient for that region to be considered authored by the human or artificial intelligence that made the edit, and the region is labeled accordingly with an authorship token corresponding to that kind of author. In an example implementation, a human authorship token is removed only if a different kind of author (e.g., an artificial intelligence but not another human) rewrites an entire region. For example, a line of code has a comment appended to the end of a line. The comment can be an empty comment or comment having one or more special characters corresponding to a specific author or specific kind of author (e.g., human or artificial). In an example, the content is a line of code having a functional code portion and a comment portion. The comment portion can include an authorship token portion and a normal comment portion. To avoid visual clutter or resist tampering, the content editor can suppress the display of the authorship token portion and permit display of the normal comment portion.

In another example, mere de minimis changes to generated text may not necessarily be sufficient to demonstrate authorship. The content editor can detect whether a user is manually editing a region of content (e.g., a line of code in an integrated development environment or text in a word processor). Responsive to determining that the edits to the content (individually or in aggregate with other edits) meet a threshold amount of characters or type of characters, there can be a check for whether an authorship token (e.g., a special comment) is already present. If not, then an authorship token is added corresponding to the author that made the change. The authorship token can usefully convey information about the authorship (e.g., whether the author is human or artificial, the author's name, the amount of content changed, other information, or combinations thereof) or even merely that the region is human authored.

Where the content is code, a language of the code can be determined by a file type of the file being edited, libraries being incorporated, analysis of header data, settings of the text editor (e.g., which syntax highlighting mode is active) or based on the context or syntax of the code itself. In such instances, a corresponding comment format for that language can be selected and used for adding the human authorship token as part of a comment. In some examples, the authorship token does not itself convey substantive information about the associated content (e.g., what the code in the line does). The authorship token can be predetermined without respect to the content of the region (e.g., not describe the line of code as a typical programming comment would or not be based on the content of the code but rather based only on authorship). The authorship token can be predetermined with respect to how the author edited the content. The authorship token can be redundant to or different from a version control system regarding the author that committed or saved the content and what is changed. For instance, the authorship token may specify which author or which kind of author (e.g., human or artificial) made the change within the text editor and the authorship indicated in the commit reflects which account is associated with the text editor or with the commit system. In other examples, the commit indicates multiple different authors in a way that corresponds to the authorship tokens. In examples, there may be a file in which user produced content is added, but artificial intelligence generated code or pasted code is not added. Such files may include the human produced content verbatim, or may include a compressed version thereof to reduce an amount of resources required. In some examples, there is a check for whether generative artificial intelligence is producing content. If so, then the human authorship tokens can be removed. If content is pasted, authorship tokens can be removed, suppressed, or special tokens can be added indicating that that the provenance of the content is unknown (e.g., possibly human generated or possibly artificial intelligence generated). In some examples, copyrighted works are automatically added to the file from a library of creative works produced or owned by the author or an organization for which the author works. The works can be added to comments in the file.

In some examples, the authorship token include information regarding an amount of content in the region that was provided by the author, such as manually by a human author (e.g., the factors that went into the significance score). The values can be updated as a user makes changes rather than being baked in all at once. For example, a user may generate a line of content with a generative artificial intelligence, make some minor changes and then move on. Later the user may return to that line and make further changes. The subsequent changes can update or replace the prior human authorship token (if any), or may be stored in a new human authorship token which may be reconciled with the previously-created human authorship token. For example, the creation of a subsequent human authorship token can take into account the values of an existing human authorship token, or the two tokens may be analyzed together to determine overall authorship of a particular region of content. Such dynamic generation, updating, and management of human authorship token(s) can beneficially improve accuracy of labeling of content in situations where a user returns to edit content several times.

In some examples and situations, a human authorship token is added to content even if the content was generated by an artificial intelligence or vice versa. The authorship token can reflect an amount of a kind of authorship to a given region, which can range from no human authorship (e.g., entirely generated by an artificial intelligence) to complete human authorship (e.g., no artificial intelligence), a mixture thereof, or unknown provenance (e.g., the content was pasted from another source or was added while an authorship tracking feature was disabled).

In examples, authorship tokens can be stored within the content being labeled. For instance, the content may be source code in plain text form with the authorship token being plain text intermingled with the source code. In further examples, authorship tokens can be stored in a same file that stores the content being labeled but without being stored within the content being labeled. For instance, a file format may store formatting (e.g., text formatting, such as font, size, boldness, style, and other information) separate from the text of the content. So too may the authorship token be stored separate from the content (e.g., text content) being labeled. In yet further examples, the authorship tokens can be stored in a separate file from the content on a same device or at a separate device.

One or more aspects of the authorship token and code itself may be captured and stored separately from the authored content in a log location or file. Such a log of authorship may be found in a text file, database, distributed ledger, or any other logging or tracking mechanism. Each mechanism of logging or tracking authorship carries different advantages and disadvantages. In one example, a text file log stored within a local directory offers the advantage of simplicity and low CPU usage, but may offer the disadvantage of not being as searchable or sharable as other solutions. It may also be more susceptible to being manipulated or altered by a malicious actor. A database (e.g., an SQL-based relational database) hosted elsewhere may offer more shared, centralized tracking, but at the cost of more computation power and complexity. Meanwhile, a blockchain or other distributed ledger solution may offer almost complete decentralization and resist manipulability, but at the cost of high computational and/or storage requirements. A person of skill in the art may weigh these and other factors in determining how to achieve desired results in view of the disclosure herein.

One or more aspects of the authorship token and code itself can be captured and stored in a shared network via blockchain, other distributed ledger, or another shared network. The blockchain can be a public or private blockchain. In an example, the public blockchain is a blockchain maintained by a government agency or other organization configured to store authorship, ownership, or other factors. Code repositories can have a distributed ledger that tracks authorship tokens or other aspects of the relevant code. Confirmed authorship (e.g., human or artificial intelligence authorship) and associated proof can be added. In some examples, content (e.g., code) itself is stored on a blockchain, using a Merkel tree, or in another manner that resists tampering. For instance, each node in the chain can be or correspond to a version of the file to resist the ability of someone to remove or modify authorship tokens. In addition or instead, the content can be added to a database.

In an example, each block in a blockchain or other similar data structure is used to track versions or authorship of content (e.g., source code) or content itself. Each block can include a hash representing one or more prior nodes. Blocks could additionally be signed by a server or something to resist rewriting from nodes or chains from scratch or otherwise tampering with data. Then the chain can be analyzed to determine the provenance of content with respect to authorship. In an example, such a system could be useful for situations of less trusted contribution. A blockchain or similar structure or process could be used for consensus for whether content is human or artificially authored. An entity can provide a blockchain with a commit to show the how the author got from the original content to the content of the commit. Manual changes to content can be tracked using blocks in a blockchain or similar structure.

In an example implementation, as part of a file-save routine, an associated program stores locally or sends something to a server, distributed ledger, or smart contract that keeps track of, among a variety of different files under management, information about authorship of the files. For instance, of X different files under management, they average Y % human authorship and Z % artificial authorship. Information can also be tracked on a per user basis, such as that of the files that user ABC creates, there is a statistical breakdown of how much AI they use or do not use. The information can be aggregated and analyzed to determine useful information, such as what kinds of functions tend to be AI generated versus human authored, the provenance of errors or bugs or security problems and trace back to what kind of author wrote it. Such trends can be used to identify deficiencies in AI capabilities or training and an AI can be trained (e.g., on the human data) to ameliorate the deficiencies.

In some examples, content produced on or prior to an artificial intelligence date can have human authorship tokens retroactively applied or generated. For example, the artificial intelligence date can be a date prior to which it should be assumed that all content was produced by a human rather than an artificial intelligence. The artificial intelligence date can be a date on which artificial intelligence features were given to users (e.g., a date on which generative artificial intelligence was approved for use or installed into a text editor). The artificial intelligence date can be a date on which sufficiently advanced generative artificial intelligence was sufficiently available to the public or certain users (e.g., the date on which GPT-3 was released to the public). Thus, an entire code base can be labeled with human authorship tokens as appropriate. When a user opens a file for editing after the artificial intelligence date and the file was last modified prior to the artificial intelligence date, then human authorship tokens can be automatically produced (e.g., according to techniques herein) and added to content in the file. In some examples, when content is being pasted from another file (e.g., part of a same or different codebase), then the modification date of the pasted-content source file is checked. If the modification date is prior to an artificial intelligence date (e.g., a date indicating that there is a special concern that content produced on or after that date may have been produced by artificial intelligence), then content pasted from such files may have a human authorship token added. Otherwise the token can be suppressed.

A file can be parsed and sections of content having human authorship tokens can be identified. Such sections can be assumed to have been created by a human rather than a generative artificial intelligence for human authorship purposes. Sections of content having artificial authorship tokens can be identified and assumed to have been authored by an artificial intelligence rather than a human.

In some examples, to resist tampering, the text editor can resist the manual creation, deletion, or modification of authorship tokens (e.g., preventing a human or artificial author from adding content mimicking the format of authorship tokens). For example, when authorship tokens are stored in the same file as the content (e.g. in the form of source code comments or other text) the authorship tokens may be encrypted, signed, or otherwise be configured to resist tampering. Tamper-resistant tokens might be unreadable or unintelligible by a human author absent separate steps (e.g., decryption or validation with a hash of known provenance). Depending on how the tokens are stored, this might not prevent deletion of said tokens, but depending on the method of encryption, may resist fraudulent additions or modifications of such tokens.

In another example, where authorship tokens or data is stored in a separate file or separate part of a file, it may have different access or editing rights as compared to a file or region of a file that is being edited by the author. The file containing authorship tokens may be non-modifiable or not readily modifiable by an author. In an example, authorship tokens are encrypted, encoded, or signed in such a way that resists tampering with the tokens. Thus, this can improve the reliability of authorship tokens by resisting the ability of a user (whether human or artificial intelligence) from inappropriately adding, removing, or modifying the tokens. Further still, authorship tokens, the content they describe, or representations thereof can be published to a blockchain, distributed ledger, Merkle tree, or in another way that resists tampering.

Content having authorship tokens can be used in any of a variety of useful ways. The same program used to generate the authorship tokens or a different program can analyze the labeled content to determine which regions have human authorship tokens and which ones lack human authorship tokens (or are labeled as being artificially authored). A report can be generated describing which regions have which kinds of authors (based on the associated authorship tokens). Such a report could support a copyright filing or notice, be used for internal monitoring of author productivity, support billing for authored content (e.g., billing for usage of AI tools), support a request for indemnification or a warranty claim with a provider of an artificial author (e.g., certain providers of artificial authors may warrant the accuracy or non-infringement of content provided by their artificial authors), other uses, or combinations thereof. Further still, identifying authors of regions can be used to demonstrate the provenance of content to an auditor (e.g., for compliance purposes, to defeat allegations of plagiarizing an AI author, or to defeat allegations of passing off AI generated content as one's own). When the content is used for training an artificial intelligence (e.g., a generative artificial intelligence), regions of the content lacking a human authorship token can be excluded or labeled accordingly to resist degradation in generative AI content quality that can arise from training on AI generated content).

In some examples, content having particular authorship can be restricted. For example, an organization may have a policy regarding whether particular kinds of authorship is permitted (e.g., an organization may want a particular amount of human or artificial authorship in certain areas). Thus, an action taken with respect to content (publishing, committing, merging a branch, sending to a third party, sending to an external party, receiving, other actions, or combinations thereof) may be permitted or disallowed based on authorship of the content satisfying or failing to satisfy a particular threshold.

In some examples, authorship can be described or stored using bloom filters or similar data structures. For example, the bloom filter can be configured to store data such that regions can be tested to determine whether region in question has particular authorship. Because of the nature of bloom filters potentially providing false positives (but not false negatives), the way that information is stored can be configured to be tolerant for those kinds of errors. For instance, an organization may be more concerned about false positives for artificial authorship than human authorship or vice versa. The use of the bloom filter can be so configured. Multiple bloom filters can be used to store other kinds of authorship information, such as internal or external.

Many examples herein are described in the context of raw, discrete content blocks (e.g., lines, functions, classes, sentences, paragraphs, etc.), but in some instances, authorship can be applied to architecture or outlines. In some examples, in addition to or instead of authorship describing authorship of raw content (e.g., the characters or other content that makes up a region), there may be authorship tokens that apply to or describe authorship of an architecture, plan, outline, organization, or other higher level structuring of content. Such tokens may appear at the beginning of a file or at the relevant regions of the content. In some instances, a region may have tokens describing high level authorship as well as low-level authorship. The delineation between high and low level authorship can be defined by policy or preferences of an implementing entity. In an example, a first author (e.g., a human author) specifies an architecture for source code and a second author (e.g., a generative artificial intelligence) creates underlying code that implements it. The underlying code can be tagged as having an artificial author using artificial authorship tokens but there can be (e.g., at the beginning of the relevant region) a tag indicating human authorship of the overall architecture implemented by the artificial intelligence. Likewise, a human can specify an outline for a document that an artificial intelligence fleshes out. Further, organizational authorship may apply when rearranging or organizing content. In an example, an artificial intelligence may generate content and a human author may rearrange the code content (e.g., moving functions to different parts of a source code file or moving paragraphs around in a narrative document). The file may indicate that there is artificial authorship for the regions by applying artificial authorship tokens thereto, but there may also be an additional authorship token that applies in such a way that describes authorship of the arrangement or organization of the content.

An example system that can benefit from or implement techniques described herein is shown and described in relation to FIG. 1.

Example System

FIG. 1 illustrates a system 10 with which one or more aspects of techniques described herein can be implemented. The system 10 includes a user device 100 with a human author and an artificial author interacting with a same text editor 12. As further illustrated, embodiments of the system 10 can further include a server 150 connected to the user device 100 over a network 190.

Figure 10:
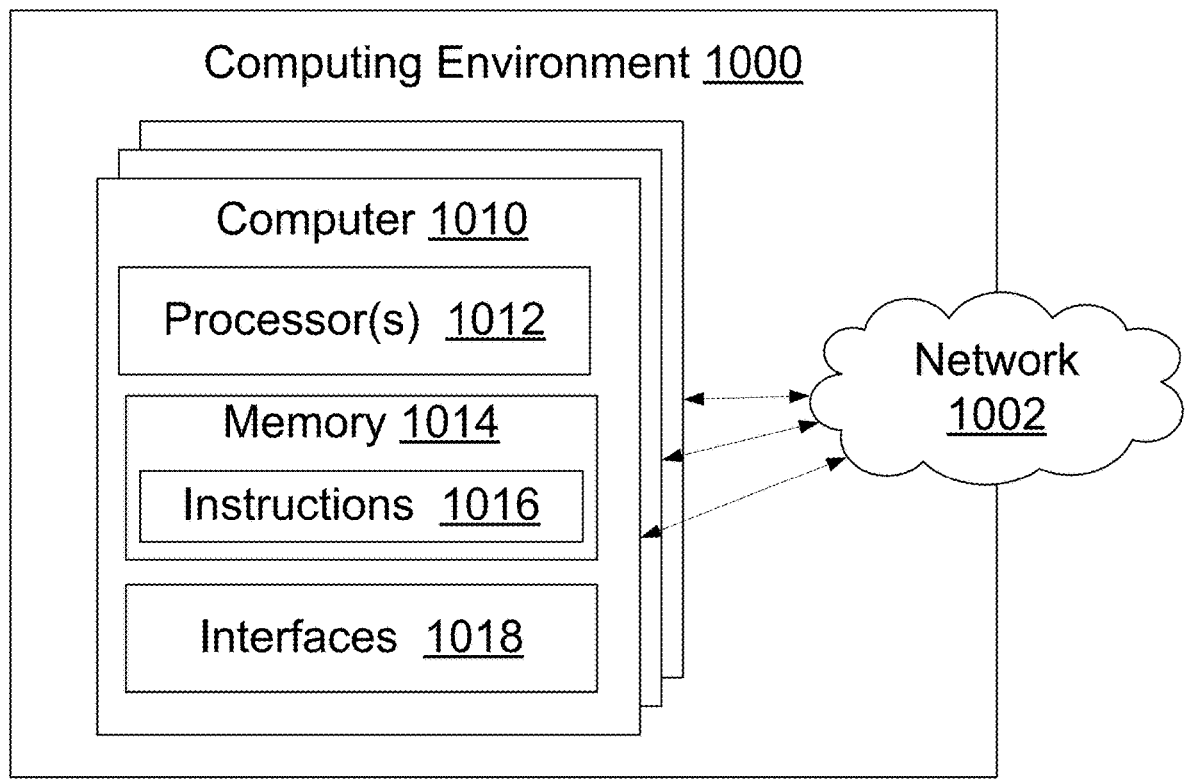
FIG. 10 illustrates an example computing environment usable with techniques described herein.

The user device 100 can include one or more aspects described elsewhere herein such as in reference to the computing environment 1000 of FIG. 10. In many examples, the user device 100 is a personal computing device, such as a smart phone, tablet, laptop computer, or desktop computer. But the user device 100 need not be so limited and may instead encompass other devices used by a user to produce content, such as text content. In the illustrated example, the user device 100 includes one or more user device processors 102, one or more user device interfaces, and user device memory 106.

The one or more user device processors 102 are one or more components of the user device 100 that execute instructions, such as instructions that obtain data, process the data, and provide output based on the processing. The one or more user device processors 102 can include one or more aspects described below in relation to the one or more processors 1012 of FIG. 10.

The one or more user device interfaces 104 are one or more components of the user device 100 that facilitate receiving input from and providing output to something external to the user device 100. The one or more user device interfaces 104 can include one or more aspects described below in relation to the one or more interfaces 1018 of FIG. 10.

The user device memory 106 is a collection of one or more components of the user device 100 configured to store instructions and data for later retrieval and use. The user device memory 106 can include one or more aspects described below in relation to the memory 1014 of FIG. 10. As illustrated, the user device memory includes text editor instructions 108, token instructions 110, and files 112, among other potential contents.

The text editor instructions 108 are instruction that, when executed by the one or more user device processors 102, cause the one or more processors 102 to provide the text editor program 12. The text editor program 12 can take any of a variety of forms, including word processing applications (e.g., MICROSOFT WORD, GOOGLE DOCS, OPENOFFICE, LIBREOFFICE, and PAGES) and software development environments (e.g., NOTEPAD++, VIM, EMACS, SUBLINE TEXT, VISUAL STUDIO CODE, ECLIPSE, XCODE, MICROSOFT VISUAL STUDIO, and PYCHARM), other environments, or combinations thereof. As can be seen, herein, "text editor" refers to a broad class of computer programs that permit the editing of text among possibly other features and need not be limited to editing plain text. While the illustrated text editor instructions 108 are local to the user device 100, technology herein can also be applied to cloud based or remote editors.

The text editor program 12 may include functionality to produce or receive content generated by a large language model or other generative artificial intelligence systems (e.g., GITHUB COPILOT or OFFICE COPILOT). Such content may be provided into a same editor window as manually entered text.

As illustrated, the text editor program 12 can be used to edit content 14, such as source code 14 that includes one or more lines of code that can include one or more comments 16.

The authorship token instructions 110 are instructions that, when executed, facilitate the labeling of content produced by the text editor 12 as having been produced by a particular author, such as a human or artificial author. In some examples, the execution of the instructions 110 cause the processors executing the instructions to provide an authorship engine that facilitates the labeling of content and performance of one or more operations described herein. In an example, the authorship token instructions 110 are written as a plugin to or as a part of a text editor 12 to create one or more authorship tokens 18. The authorship tokens 18 may be stored in the files 112, or in separate files associated therewith. In another example, the authorship token instructions 110 may execute at the user device 100 as a service concurrently with use of text editor 12, and may monitor various user interfaces of the user device 100 to determine user input intended to be received at the text editor 12, and to generate authorship tokens, which may be stored in the files 112 adjacent to content, or in separate files entirely, such as authorship token files/data 114. In such instances, the authorship token instructions 110 may similarly create authorship tokens 18 in parallel with entry at text editor 12. Execution of authorship token instructions 110 can cause performance of one or more operations of method 200.

The server 150 is a server device that can function as part of one or more processes described herein. In the illustrated example, the server 150 includes one or more server processors 152, one or more server interfaces 154, and server memory 150, among other components.

The one or more server processors 152 are one or more components of the server 150 that execute instructions, such as instructions that obtain data, process the data, and provide output based on the processing. The one or more server processors 152 can include one or more aspects described below in relation to the one or more processors 1012 of FIG. 10.

The one or more server interfaces 154 are one or more components of the server 150 that facilitate receiving input from and providing output to something external to the server 150. The one or more server interfaces 154 can include one or more aspects described below in relation to the one or more interfaces 1018 of FIG. 10.

The server memory 150 is a collection of one or more components of the server 150 configured to store instructions and data for later retrieval and use. The server memory 150 can include one or more aspects described below in relation to the memory 1014 of FIG. 10. As illustrated, the server memory 150 can store text editor instructions 108, authorship token instructions 110, files 112, and authorship token files or data 114, among other files, data, or instructions. Such materials can perform the same or similar functions to those described in relation to the user device 100 and elsewhere. In addition or instead, they can perform server specific aspects and optionally cooperate with the user device 100 or other devices to perform operations or other aspects described herein.

The network 190 is a set of devices that facilitate communication from a sender to a destination, such as by implementing communication protocols. Example networks 190 include local area networks, wide area networks, intranets, or the Internet.

Example Method

Figure 2A:
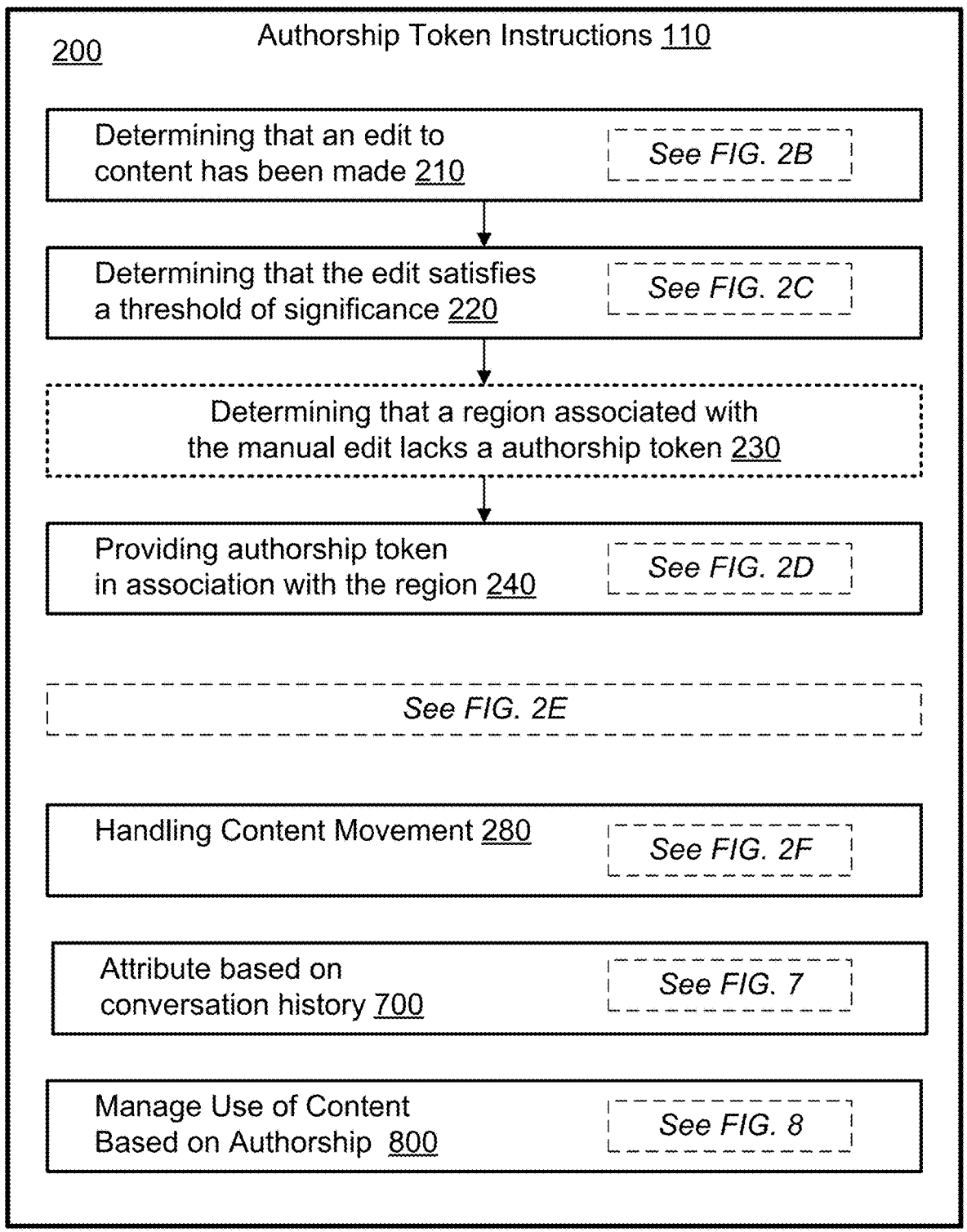

FIG. 2, which is made up of FIGS. 2A-2E, illustrates a method 200 that can facilitate the providing of authorship tokens. One or more operations of this method 200 can be performed in real-time while an author is using the text editor 12. Operations can be performed automatically or at least partially automatically. Where aspects herein are described as being predetermined or configurable, one or more parameters affecting such determinations or configurations can be specified by a user or administrator.

In an example, the method 200 is performed by an authorship engine while a text editor 12 (e.g., a development environment) to a developer having a file 112 containing content 14 (e.g., source code). The text editor 12 can be provided by executing the text editor instructions 108 using the one or more user device processors 102. The method can begin with operation 210, which is shown in more detail in FIG. 2B.

Operation 210 includes determining that an edit to content has been made. Here, "edit" is used broadly and can include creating new content, removing existing content, or modifying existing content. In the text context, edits often include one or more insertions, deletions, replacements, or movements of characters of the text (e.g., source code), whether on an individual character level or on a whole word or multiple character level. But edits can include other changes, such as modifications to formatting of text or other content. In some examples, the definition of edit is configurable by a user.

The edit can be a manual edit made by a human or an edit made by an artificial intelligence, and the determining includes determining the authorship of the edit. This can include determining that a human user of the development environment (e.g., text editor 12) has made a manual edit to the content 14 within the text editor 12. It can also include determining that an artificial user or generative tool has made an edit to the content 14 within the text editor 12. Manual edits include the product of a human developer and have human authorship. Manual edits can be contrasted from artificial edits or AI edits, which can be the product of generative AI.

In examples, certain automated actions may nonetheless be classified or considered as manual edits rather than AI generated edits. Such certain automated actions may include actions or features, such as autocorrect (e.g., automatically changing a common misspelling to a word that is believed to be correct), spell check (e.g., automatically or manually changing or suggesting a word), predictive text, autocomplete (e.g., a prediction of a rest of a word, line, phrase, or other logical grouping), code completion (e.g., suggesting variables, functions, classes or other components based on a current context or namespace), find-replace (e.g., automated bulk renaming of a find string to a replace string), automated refactoring, other features, or combinations thereof. Whether and to what extent such features count as manual or AI edits may depend on predetermined user or organization-specified preferences. In addition or instead, a significance of the changes or the human involvement may be determined and used to decide whether an edit is considered human, manual, or mixed. Certain of the above features may be fairly classified as either human or AI generated depending on the context and implementation. For instance, a human accepting simple autocomplete prediction of the rest of the word, phrase, or even line or sentence may be considered as a human edit depending on preferences and an sophistication of the underlying implementation.

In an example, this operation 210 can include operations 212, 214, and 216.

Operation 212 includes determining that the text editor 12 received one or more modifications to the source code 14 via a human interface device of a computing environment associated with the text editor 12. Such human interface devices can include one or more mice, keyboards, touch screens, microphones, or gesture controllers, among others. Detecting receiving content over a human interface device can be done using any of a variety of known key logging techniques. Many text editors 12 or operating systems on which text editors can run have application programming interfaces that can detect keypresses of a keyboard or other input from a human interface device. Responsive to determining that the one or more edits are via a human interface device, the edit can be considered a manual edit.

Operation 214 includes determining whether the edit is characteristic of a manual edit or an artificial edit. In some examples, a size or manner of an edit is used to infer that the edit is a manual edit (e.g., authorship of the content is human). For instance, a human typing on a keyboard may tend to enter text or make changes a single character (e.g., because of a single keystroke) at a time. Thus, edits made in that fashion can be determined to be human. Similarly, content generally entered in blocks that correspond to more than one character may be inferred to be artificial edits. In other examples, more sophisticated techniques can be applied. For example, a machine learning algorithm can be trained to identify human or non-human authorship based on a manner in which content is provided. For instance, a human may tend to make spelling mistakes, make edits to content in a bursty manner (e.g., because the human author pauses to think after writing a segment of content), and go back and make changes to recently provided content, among other human tendencies. Likewise, artificial authors may tend to provide input in a characteristic manner. A machine learning algorithm can be trained to identify human or artificial authorship based on the presence or absence of such features when analyzing a way in which content is added to the text editor (e.g., using techniques described in relation to FIG. 5). Further, a speed at which content is provided can be used to infer authorship. A human may tend to have particular average or maximum speeds of editing content, which may be different from (e.g., in some instances, less than) that of a generative artificial intelligence. Responsive to determining that the edit is characteristic of an artificial author, the edit can be considered to be an artificial edit. Responsive to determining that the edit is characteristic of a human author, the edit can be considered to be a manual edit.

Operation 216 includes determining whether a generative artificial intelligence is active. Artificial intelligence features may be active or being used to provide the edit. In examples where artificial intelligence features are hosted remotely from the computing device or development environment, querying whether artificial intelligence features are being used may include monitoring submissions to a remote API or responses thereto, monitoring usage at a user account associated with the generative artificial intelligence, other actions, or combinations thereof. In examples where artificial intelligence features are integrated into the development environment, querying whether artificial intelligence features are being used may include analyzing one or more settings or environmental variables of the development environment, surveying installed features or capabilities on the computing device, or monitoring resource usage of such features at the computing device. Responsive to determining that the edit is made while an artificial intelligence is being used to provide the edit, the edit can be considered to be an artificial edit. Otherwise, the edit can be considered a manual edit.

Following operation 210, the flow of the method 200 can move to operation 220, which is shown in more detail in FIG. 2C.

Operation 220 includes determining that the edit satisfies a threshold of significance. The threshold of significance can be with respect to a region that was edited. In some examples, the operation 220 can be performed with respect to a lower-level region and then repeated for higher level regions (e.g., after operation 240). For example, the edit may be to a line of source code. The threshold of significance can be determined with respect to that line of code and then subsequently to higher level regions, such as a function, class, or entire file.

While in some instances, any level of edit can be sufficient to cause an authorship token to be added or modified, in other examples, a threshold of significance may need to be reached. In examples, the threshold of significance can be a proxy for an amount of significance likely to make the code human authored rather than authored by a generative AI or vice versa. In some examples, the threshold is set by a policy of a user or organization. In some example embodiments, the significance threshold may differ depending on the type of content being created. For the creation of a new line of code or other new content, this can be relatively simple and can often be resolved by determining the authorship of the edit (e.g., a manual or artificial edit). In other examples, the editing of existing code (e.g., code initially created by a generative artificial intelligence) can present more difficulty. In some instances, the edit is the accumulation of multiple edits that, on their own, are not significant but in aggregate are significant. Operation 220 can include operations 222, 224, 226, and 228.

Operation 222 includes determining that the edit changes more than a predetermined threshold number of or percentage of units of content (e.g., characters or words of the source code, text, or a region thereof) have changed. The threshold can be a configurable predetermined number. Responsive to satisfying the threshold the edit can be considered significant, otherwise the edit can fail to be considered significant.

Operation 224 includes determining whether the edit is a functional or cosmetic change. Code functionality can refer to aspects that affect the functionality of code (e.g., changing a mathematical operation) rather than more cosmetic changes (e.g., refactoring a variable name, changing an order of arguments or variables passed to various functions, and the like). In examples, the determining can include determining that the edit is to a portion of the source code other than comments, with a comment delimiter being recognized based on the specific type of code or language in use within the development environment. Such determinations can weigh in favor of the threshold of significance being satisfied.

The change being functional or cosmetic may be more easily determinable in the source code context than in narrative documents. In a narrative document, a change can be determined to be to the function of a word, sentence, paragraph, or other region for the purposes of this analysis if the meaning of the region changes. For instance, adding "un" to "believable" changes the meaning of the word. Likewise, changing "the rock is big" to "the rock is small" changes the meaning of the sentence. But changing "the rock is giant" to "the rock is massive" might not be considered to change a meaning of the overall sentence. In an example, a natural language processing library or a large language model is used to determine whether the meaning has changed and a significance of the change of the meaning. In an example, a difference in meaning between words is determined by comparing a distance between the words in an embedding space using. In certain instances, one or both of cosmetic and functional changes can be important to authorship. Their relative importance in the analysis can be configurable.

Operation 226 includes calculating a significance score. If the significance score satisfies a threshold, then the edit can be considered significant. Calculating the significance score can take any of a variety of forms. In an example, calculating the significance score includes performing one or more of the following operations and using an associated output thereof: determining whether one or more comments have been modified; determining whether one or more non-comment code portions have been modified (e.g., changes to comments may be considered to be relatively less significant than changes to non-comment portions); determining whether an operation has changed from a first operation to a second operation (e.g., because changes to operations can represent a higher level significance); determining whether a variable has been changed from a first variable to a second variable (e.g., because changes to variables may represent a higher level of significance); determining whether a functionality of the code has changed (e.g., which may have a higher level of significance); determining whether a cosmetic or readability change to the code has been made (e.g., which can have a relatively lower amount of significance); determining whether the manual edit includes pasting (e.g., relatively less significance or ambiguous depending on whether the provenance of the pasted content is known); determining whether the manual edit includes moving code; determining an amount of AI assistance used; determining an amount of development environment assistance used; and determining whether the code has been refactored. For instance, each answer to one or more of the above can be associated with a weight or score. The sum or another use of such weights or scores can be compared the threshold of significance. The relative weights or scores can be customized according to user or organizational preferences. In some examples, the significance of manual edits is compared to the significance of generative artificial intelligence edits (e.g., which may be calculated using the same or similar criteria). In some examples, the above can be provided as input to a machine learning model trained to provide an output indicative of significance.

Operation 228 includes accounting for the generative artificial intelligence's prompt or other input provided in the generation of the content by a generative artificial intelligence. For example, the artificial intelligence may be sufficiently constrained by the prompt, surrounding context, or human input that the resulting content should be considered to be authored by a human even if produced by an artificial intelligence. In some examples, the significance can take into account a level of intelligence or creativity of the artificial intelligence used to produce content. For example, different kinds or levels of artificial intelligence or content assistance can be graded with different levels of intelligence and treated differently for the purposes of authorship depending thereon. For example, content produced by simple assistive features like spell check, autocomplete (e.g., finishing a word based on what a user already began typing), or rudimentary intelligent code completion (e.g., suggesting functions or variables for selection or confirmation by a user based on code scope) may be considered to be produced by a human author even though such features may include relatively sophisticated levels of artificial intelligence. The threshold required to be met for content produced by such systems may be relatively low or even nonexistent. By contrast, more sophisticated intelligent systems like GITHUB COPILOT may be considered as setting a higher threshold for human authorship. Some assisting programming tools may allow for configurable levels of help and the greater the amount of judgement or creativity taken on by the assistive feature, the greater the threshold of author involvement there may need to be for human authorship to be considered to have taken place. In some examples, prompts used to generate content can be stored in association with the authorship token and used to demonstrate sufficiency of creativity or lack thereof. Such prompts can be stored in a same location as the authorship tokens or in a separate location.

In addition to or instead of analyzing the significance of each individual edit, the significance of a collection of or a history of edits can be determined. For instance, the method 200 may detect an edit and then wait a predetermined amount of time (or until an event occurs) to see if one or more additional edits have been received to the region of interest. Then, after a threshold amount of time has passed (or a specific event has occurred, such as saving, compiling, running, or committing the code) since the last edit has been received, the method can analyze the collection of received edits for their significance with respect to the region. In an example, a comparison is made to the string of text before and after edits are received. In some examples, edits (or proxies thereof) can be accumulated during a session (e.g., in memory, in a buffer, in human authorship tokens, in log files, or elsewhere) and then upon saving, periodically during the session, or at another time, the accumulated edits and can be analyzed for their significance in their various regions and authorship tokens are generated accordingly. In an example, keylogging or other tracking is performed to generate manual edits, then they resulting log is analyzed for significance, human authorship tokens are generated, and then the log is deleted (e.g., to preserve privacy, free up space, or for other reasons). A comparison of the changes to the file 112 since the file was last saved (or at another point in time) can be made and human authorship tokens are created, updated, or removed based on those edits. This can facilitate handling situations in which content is added and then removed, reduced, or significantly expanded, thereby improving the accuracy of the authorship tokens in labeling content.

In some examples, the significance of a manual edit is determined based on the content of a suggested artificial edit. For example, some implementations of generative AI assistants (sometimes referred to as "copilots") automatically suggest what the user may want to write next in the form of the suggested text being written in a different shade than already-entered text and extending past the cursor. Typically, if a user hits the "tab" button, then suggested text is entered and the cursor moves to the end of the just entered text. Alternatively, the user could write manually. In some instances, if the user writes something different than what is suggested, then a new suggestion replaces the old suggestion or the suggestion disappears until the generative AI proposes a new suggestion. In some instances, the suggestion remains visible if the user manually types the words of the suggestion. In some implementations, the significance or provenance of an edit is affected by whether a user is merely manually entering suggested text. For example, an authorship engine can compare text entered manually by a human with text suggested by an artificial intelligence. If the text is identical or substantially similar, then the engine may determine that no significant human authorship occurred (e.g., because the human user was merely manually following the artificial suggestion). However, in some instances, the edit may be considered to have human authorship if the suggestion by the artificial intelligence lacks significance of its own. How the authorship engine handles content provided in that manner can depend on policies and preferences set by the user or an organization. For example, there may be circumstances where it is desirable to resist circumstances in which a human user merely manually edits what an AI user suggests to have the content receive human authorship attribution for something that was actually authored by an AI. But on the other hand, it may be the case that the AI "thinks" of the same content that the user did and suggests it faster than the user can type. It may be undesirable for the user to lose credit in such a circumstance. The authorship engine may provide configurable settings or preferences to address authorship in such situations to achieve a desired balance.

In addition, the level of an author's involvement can be a factor in determining authorship. In some instances, human authors are present for and supervise the creation of content by an artificial intelligence. In some implementations, that level of involvement can be a factor in indicating that human authorship is present despite the actual content being created by an artificial author. In other instances, the artificial author may autonomously or semi-autonomously generate the content with little to no human supervision or input. Such a relatively limited level of involvement may weigh against a finding of human authorship. Thus, the nature of involvement (even supervision) by the authors can be a factor in determining authorship. A human accepting, certifying, or supervising changes to content by an artificial author may weigh in favor of human authorship even if such involvement does not happen contemporaneously with the artificial authorship (e.g., the human may provide such involvement at a later time).

In an example, an AI suggests a first portion of content, whereupon the human author begins typing a second portion of content different from the first. The AI then updates its suggestion based on the typed beginning of the second portion of content and suggests a third portion of content. When the human accepts the suggested third portion of content, then that accepted suggestion may be considered to have human authorship even though it was suggested by an AI because it reflected human creativity in disregarding the first portion of content that was suggested by the AI and affirmatively beginning an alternative portion. User or system thresholds may be needed to determine how much accepted AI content qualifies as human authored in this instance. These thresholds may reflect a count of letters, words, or sentences; or the thresholds could be variable (e.g. as a multiple of the amount of text entered before accepting the suggestions) or the thresholds could be AI-determined based on one or more factors such as length of accepted content; how different the first, second, and third portions of content are from each other; and how original the resultant content is.

Following operation 220, the flow of the method can move to operation 230.

Operation 230 includes determining that a region associated with the edit lacks an authorship token. The operation 230 can be performed responsive to determining that the edit satisfies the threshold of significance as determined in operation 220. This operation can include searching contents of the region of interest for the authorship token itself (e.g., using regular expressions configured to find regions of content having a format associated with authorship tokens).

This operation can include determining the one or more regions in which the significant edits were made. The region can take any of a variety of different forms depending on a level of granularity desired by a user. Where the content of the text being edited is source code, the region can include forms such as: a line of source code, a lexical scope, a function level, a class level, a file level. Where the text is prose, the region can take the form of a sentence, paragraph, page, chapter, section, or entire work.

In other examples, this operation need not be performed. The creation of a new authorship token need not be dependent on the lack of a previous token. In some examples, multiple tokens can be created that relate to the same or overlapping content. Later, the combination of the contribution (e.g., as expressed by the presence of or content contained within the multiple human authorship tokens) can be assessed to determine whether an overall work reaches a threshold of human or artificial authorship. In some examples, a prior authorship token is updated (e.g., rather than provided as in operation 240 below) based on the content of the edit.

Following operation 230, the flow of the method 200 can move to operation 240, which is shown in more detail in FIG. 2D.

Operation 240 includes providing an authorship token in association with the region. The operation 240 can be performed responsive to determining that the region associated with the manual edit lacks an authorship token or lacks an authorship token consistent with the author of the edit. The authorship token can take any of a variety of useful forms. In many examples, authorship tokens can convey information regarding whether an associated region has or is associated with human or artificial authorship. Other authorship types or useful information can be conveyed in an authorship token. For instance, the authorship token can convey whether the author is internal to or external from an organization or what the source of the authorship is. In some examples, the authorship tokens can also express uncertainty regarding authorship. For example, authorship may be unknown and the authorship token can describe that lack of knowledge. Authorship information can be expressed in any of a variety of ways. In an example, the human authorship token includes a human-readable plain text description of authorship (e.g., "human author", "artificial author", "COPILOT-v2-Authored", "internal human author", "internal chatbot author", "external chatbot author", "unknown author", or "authored by human John Doe with minor support by chatbot"). In addition or instead, the authorship information can be compressed into a smaller format where symbols, characters, or abbreviations are used to convey authorship or keys to a lookup table are included. In some examples, the authorship is described in a form other than plain text.

In an example, the authorship token is included in a comment within source code (e.g., within a comment 16 as illustrated in FIG. 1). The authorship token can be appended to the end of a line of code, can be applied to a preceding line of code, or be applied in other locations. In some instances, authorship tokens are placed in particular locations before or after traditional code comments (e.g., which describe functionality of the code at issue). The comment can be created if one does not already exist. The authorship token can be added to the beginning or end of the comment. The comment can be inserted at a beginning of the region, an end of the region, or between a beginning or end of the region. In some examples, when a file is saved or at another predetermined time, the authorship tokens in a file can be automatically relocated to a more convenient location (e.g., before or after traditional comments or to a different region).

The authorship token can be predetermined and without respect to the substance of the edit. For example, in a C++ source code file, the token could be simply the "//" single-line comment marker placed at the very end of the line, where it would not interfere with any code or other comment. Alternatively, in the same circumstances, the editor may place a single line comment marker followed by a known series of letters to indicate human authorship, such as "//H". In some examples, the human authorship token can include information about the manual edit (e.g., a number or percentage of characters of the region that have changed) without including the actual changes or without substantively describing the changes (e.g., without being able to reproduce the specific changes merely from the information contained within the authorship token). The inclusion of such data can allow the information to be used later when determining whether to update authorship. The authorship token can be without respect to a form or function of the region in which the edit occurs (e.g., the authorship token can lack information describing the code of interest).

The authorship token can include one or more uncommon characters of a character encoding standard. This can be used to resist confusion and make it more likely to be identified compared to traditional comments that may be made to the source code. An authorship token can include a name associated with the developer or author (whether human or artificial) making the edit.

In some examples, the content of the authorship tokens can vary depending on the region. For example, where the file is a source code file, individual lines of code can include authorship tokens specifying a particular level of detail, whereas authorship tokens at a function, class, or file level can include relatively greater or lesser levels or kinds of detail. For instance, a line may specify a number of characters or words that were the product of human authorship, whereas a function may include a number of lines that were the product of human authorship (or were the product of more than a threshold amount of human authorship), and whereas a class may include a number of functions that include human authorship (e.g., more than a threshold amount thereof). Of course, authorship tokens may include any of variety of kinds or amounts of information. A person of skill in the art may create a format of authorship tokens that fits with a desired use case.

In some instances, the authorship tokens include an identifier such that information about authorship can be found in another file or in another location within the same file. For instance, the authorship token can be of the form "{H123abc}" where "H" indicates that the associated region has human authorship ("A" may be used to indicate artificial authorship) and "123abc" may be usable to find a portion of another file that describes more about the authorship of the region, such as information about the provenance of the region or its edits, prior authorship, other information, or combinations thereof.

In some examples, an authorship token is stored in a format that is not readily recognizable or editable to a human or an AI. In an example, one or more authorship tokens are stored in a QR code or another visual code that encodes the data.

Operation 240 includes operations 242, 244, 246, and 248.

Operation 242 includes including a portion of a creative work. This can be done to add a copyrighted work to the source code to enhance the copyrightability of the source code file. Including the portion can include accessing a library of creative works that the editor has access to and permission to use. The creative work can be a creative work that is owned by the user or an employer of the user. A snippet of the creative work can be copied and added to the authorship token or added in association with a line of code to which the authorship token is present. The creative work can continue across multiple human authorship tokens. For instance, the portion of the creative work is a continuation of a prior portion of creative work part of a prior authorship token. In an example, when an authorship token is added between two existing human authorship tokens, the corresponding portions of the creative work are automatically updated so they flow in the correct order. In some examples, the creative work can be appended to even that content that was not authored by a human. The addition of such creative work could be used to demonstrate the copyrightability of the source code. For instance, a first authorship token may include "Lorem ipsum dolor sit amet", a second may continue "consectetur adipiscing elit", a third may continue further "sed do eiusmod tempor", and so on, where the standard Lorem Ipsum passage is replaced by a copyrighted work of the author or an organization of the author. In some examples, copyrighted works are added only to regions associated with artificial authorship tokens and not human authorship tokens. In other examples, they are applied regardless of whether human or artificial authorship is specified.

Operation 244 can include adding one or more features to resist mimicry or tampering. A concern can be that once generative artificial intelligence learns that humans tend to put human authorship tokens in their text (manually or automatically), that the generative artificial intelligence will add those human authorship tokens too. Further, a malicious human might manually add a human authorship token content that an artificial intelligence wrote. The features used to resist mimicry can take any of a variety of forms. In one example, the authorship token (or characteristics thereof) can be added to or derived from an exclude list for the generative artificial intelligence associated with the editor 12. Thus, the generative artificial intelligence would resist producing such tokens because it is prohibited from doing so. In some examples, authorship tokens are removed from training data or context data prior to their use with an artificial intelligence.

In another example, the authorship token can include a hash, optionally signed by a private key. The hash can be of the region, the manual edit, or another useful item that is optionally salted with a private or hidden value to resist reverse engineering. Based on the nature of hash functions, it would be difficult if not impossible for the generative AI or a malicious human to learn the hash function (and salt) used or the input to the function that produced the given result. Thus while artificial intelligence may learn to produce something that looks like a hash but that, upon trying to verify the hash, it would fail because it was not produced according to a predetermined method. In some examples, the authorship token can be cryptographically signed by a key of the human token instructions. Beneficially, this could resist even a human attempting to tamper with the human authorship tokens (e.g., by copying and pasting existing human authorship tokens into regions lacking them) because reproducing the signature would be difficult for the human to do. In some examples, the resisting can occur during or in response to user saving, running, or compiling the file or at another predetermined time or every time an authorship token is added. At that time, a hash of the region can be taken and put into the human authorship token. Waiting until a predetermined time can decrease an amount of resources consumed and ensure that the user is sufficiently done editing before creating the hash.

In yet another example, the text editor 12 can prohibit or prevent the direct modification of authorship tokens by human or artificial authors. In an example, only the text editor 12 (or another program running the authorship token instructions) is permitted to modify the authorship tokens.

Operation 246 can include modifying additional regions. In some instances, although an edit is made to one region, other regions are also affected by the change. For instance, an edit to region corresponding to a single line of code may nonetheless affect authorship of a larger region (e.g., a function or class) containing that line of code. For instance, a function may include a function header (e.g., that includes definition of the function's return value type, the function's name, and the arguments that the function) and one or more lines of code in the body of the function, including a line with a return statement. A change to the one or more lines of code in the body may be significant enough to change the authorship of the entirety of the function, even if some portions of the function (e.g., the header) were written by another author or type of author. Likewise, an edit to a function may result in an entire class containing that function changing authorship if the edit is significant enough. So too might a change to a class or other region of a file cause an entire file to change authorship. Whether and to what extent authorship changes can be defined by parameters and can be determined in a similar way that an edit's significance is determined (see operation 220, above). Further, even if the edit to one region is not sufficient to change the authorship of a higher level region, it may be sufficient to cause the higher level region to indicate mixed authorship and to mark other regions at the same level as the one to which the edit was made as having particular authorship. For instance, an entire class may be authored by an artificial intelligence and there can be an artificial authorship token proximate the class definition to indicate that the entire class is authored by an artificial intelligence. Lower-level regions (e.g., class variables, class functions, and individual lines of code within those functions) may lack authorship tokens (e.g., to avoid visual clutter because authorship is already described by the class). If a different author modifies a lower level region of that class, that lower level region can be updated with an authorship token corresponding to that author. In some examples, authorship tokens are not applied other regions under that class because it can be assumed that non-labeled regions have a same authorship token as a parent region. In other examples, such other regions are labeled with authorship tokens corresponding to their parent region.

Operation 248 can include adding the authorship token to a separate file 114. In such examples, the authorship token is not added directly to the file in which the manual edits are made (e.g., which stores the content). In some examples, the authorship token is added to a separate file, such as a log file, that is in association with the file being edited. The separate file 114 can have a portion associated with the region. The authorship token in the file 114 can be produced such that one is able to determine which region of the file 112 has human authorship. For example, the log file 114 could include one line for each line in the content file 112 and list authorship information, line for line. In another example, the log file 114 could reference lines in the content file 112 by line number and provide authorship information for each line of the content file 112 that contains text. In another example, the log file 114 could refer to regions of content in the content file by title, description, number, name, or other signifier based on the content to provide details of authorship for the given region. This log file 114 may be stored as simple text, XML file, JSON file, tab-delimited file, comma-delimited file, rich text file, image file, PDF file, or any of hundreds of program-specific file implementations such as Microsoft Word document, Microsoft Excel file, or the like.

In some examples, the operation 240 includes sending a communication to a server or calling an application programming interface associated with a server or another program regarding one or both of the edit or the authorship token. The server can be a remote device that logs authorship of contributions to source code. The server could store authorship tokens directly or store additional information regarding an authorship token stored in the file 112. Storage by the receiving server or program may be accomplished through creation of a log file 114 as described above, through storage in a database (such as SQL-server, Progress database, MongoDB, Oracle database, or any such similar tool), or any other known file 114 and data storage system. Such system could be local or remote to the receiving server or program. Though often referred to herein as being a single file for convenience one or both of the content file 112 and the log file 114 can be broken up into multiple separate files or collections of files.

In some examples, following operation 240, the flow of the method returns to operation 220 to determine whether the edit reaches a threshold of significance for a different region (e.g., a higher level or lower level region). For instance, whether the change to a line reaches a threshold of significance for a function, class, or file. Or whether a change to a sentence reaches a threshold of significance for a sentence, paragraph, section, or document.

In some examples, the method 200 includes additional operations, including those shown in FIG. 2E. Such operations include operations 250, 252, 254, 256, 258, and 260, among others.

Operation 250 includes hiding authorship tokens. The authorship token can be hidden to, for example, preserve that information but resist distracting a user or resist tampering by the user. The authorship token can be automatically collapsed by the text editor but can be expanded by the user on demand, if permitted by a policy. In other examples, a user may need to have sufficient permissions to expand or view an authorship token within the text editor. The underlying content of the authorship tokens may be hidden from the user by obfuscating them via encryption. An authorship token can include a plurality of zero width characters that encode information (e.g., information described as being included in the human authorship token elsewhere herein). In an example, the authorship token are automatically hidden from the user by the text editor, but the authorship token may nonetheless be accessible for updating and/or analysis within the platform (e.g., by authorship token instructions). In some examples, hiding the authorship tokens include storing the authorship tokens in a location or format that is not readily accessible to the user.

Operation 252 includes committing the content, which can include committing a file containing the content using a version control system that associates the commit with the developer. While illustrated as being part of the authorship token instructions, this operation is often performed by a separate application or as part of a process managed by the text editor. In examples, the version control system may receive the commit of a new file or changes to an existing file as having been done by the author. In some examples, the version control system parses the file and attributes authorship to those regions having authorship tokens. Generative artificial intelligence authorship can be attributed to those regions lacking human authorship tokens.

Operation 254 includes generating generated content (e.g., code) using an artificial intelligence (e.g., generative artificial intelligence). While illustrated as being part of the authorship token instructions, this operation is often performed by a separate application or as part of a process managed by the text editor. The generating can be based on, for example, the source code and the generated content can be inserted into the file. The content generated this way can lack a human authorship token or include an artificial authorship token. However, if the user subsequently sufficiently manually edits the generated code, then a human authorship token may be applied (e.g., based on how the human token instructions are configured and based on sufficiency of the manual edits).

In examples, the operation 254 can further include operation 256. The operation 256 can include determining whether to remove an existing human authorship token. Where the generated content is within a region having a human authorship token, it can be determined whether to remove the human authorship token. In examples, such a determining can be the same as or similar to the determination of whether the manual edit satisfies a threshold of significance. The determination can be made whether the generated code passes the threshold. In addition or instead, it can be determined whether the existing code (or surviving code if the generated code changes some of the existing code) is significant given the generated code.

Operation 258 includes parsing the file and identifying one or more human regions based on presence of one or more human authorship tokens; and paring the file and identifying one or more other regions lacking one or more human authorship tokens.

In examples, the operation 258 can further include operation 260. The operation 260 includes taking an action based on the output of operation 258. Thus, the method can include providing a report regarding an amount of human or artificial authorship of the source code based on the one or more human regions and the one or more other regions. The method can include providing a copyright notice regarding the file that indicates human authorship of the one or more human regions. The copyright notice can indicate a lack of human authorship of the one or more other regions. In examples, the action includes providing the one or more human regions to an artificial intelligence for training. But a training process may resist providing the one or more other regions as to the artificial intelligence for training. Thus, quality of training materials may increase through the providing of human authored contend rather than synthetic content already produced by a generative artificial intelligence.

Operation 262 can include determining that a region associated with a second manual edit is already associated with a human authorship token. Further, responsive to determining that the region associated with the second manual edit is already associated with the human authorship token, the human authorship token in association with the region can be updated or preserved.

Operation 264 includes saving the file 112 containing the content 14 and the authorship tokens 16. In an example, the operation includes saving the file 112 in a rich text format. The file 112 can be formatted according to a document standard, such as ISO/IEC 29500-1:2016 or a successor standard. In an example, the file 112 stores data using XML. The XML may include tags associated with authorship tokens. The XML may include one or more dedicated tag for distinguishing a portion of the content 14 of the file 112 as being authored by a human or an artificial intelligence. In an example, the operation 264 includes saving the file 112 in a plain text format. The file 112 may lack stylistic information. The file 112 may have a file extension associated with a programming language, such as Python (.py), C (.c or .h), C++ (.cpp or .c++), C# (.cs), or Rust (.rs). The file 112 may be directly usable by a compiler or an interpreter of a programming language. The file 112 may be in binary format. The file 112 can be saved with or in association with metadata describing authorship of the content in the file 112. For instance, the metadata can describe a number of or percentage of characters, words, or other delimitations of content as that have certain kinds of authorship (e.g., human or artificial).

Figure 2F:
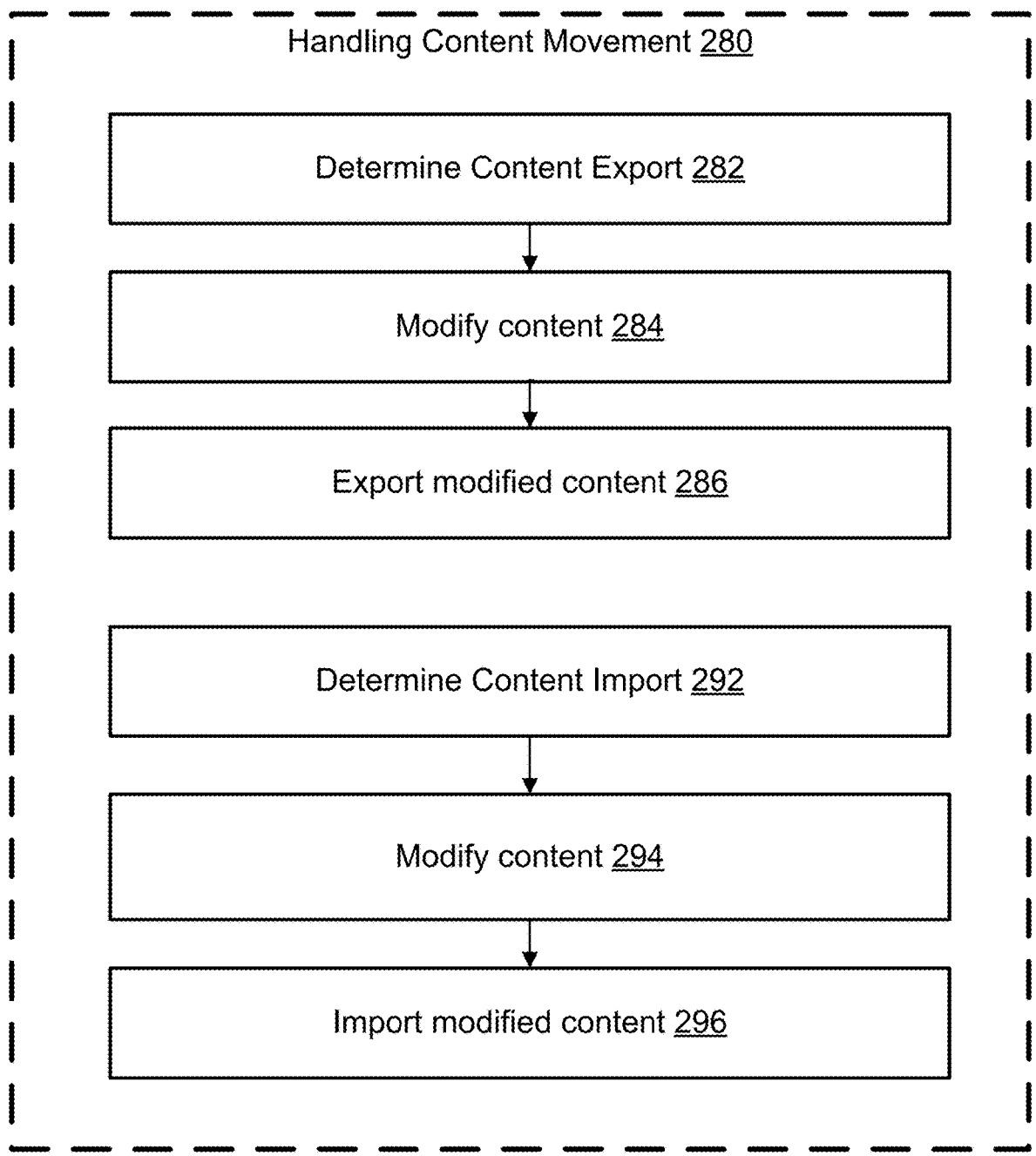

The method 200 can further include operation 280, which is described in more detail in FIG. 2F.

Operation 280 includes handling content 14 movement. During use of the text editor 12, content may be moved to the text editor 12 from another source (e.g., a location external to the text editor 12, such as a website or another program), moved within the text editor 12 (e.g., from another location within a same file 112 or from a different file open in the text editor), or moved from the text editor 12 to another source. Operation 280 can include operation 282 and operation 292.

Operation 282 can include determining that content is being exported from the text editor 12, such as from the file 112. Content exportation can include detecting a cut or copy operation is occurring on some or all of the content 14, detecting that content is being dragged out of the file 112, detecting that a screenshot is being taken, detecting that an export operation is selected from a menu of the text editor (e.g., a function called "save as" or "export to"), detecting other exportation occurrences, or combinations thereof. In an example, detecting such operations includes using one or more APIs of an operating system on which the text editor 12 is running. In addition or instead, this can include detecting user input corresponding to exporting data. The detecting can include detecting a particular operation within the text editor is being activated. Detecting can occur in other ways too. In some instances, the text editor 12 includes a special export option that relates to authorship data, and determining that content is being exported can include detecting that such a special option was activated. Following operation 282, the flow of the method can move to operation 284.

Operation 284 includes modifying the content being exported. The modification can take any of a variety of forms. Authorship tokens can be removed from the content being exported. Authorship tokens can be added to content being exported (e.g., where the content being exported lacks an authorship token but is within a region associated with an authorship token). For example, an authorship token of the region from which the content is being exported is added to the content being exported. Modifying the content can include removing content associated with particular authorship. For example, the content being exported may include multiple different kinds of authorship (e.g., human, artificial, internal, or external, among others). An entity controlling the text editor 12 may have policies regarding whether content having a particular kind of authorship can be exported. Thus, the content can be modified to remove content having authorship that is not permitted to be exported. In some examples, the content is modified to indicate that certain content was not exported.

In some examples, modifying the content can include adding or modifying authorship tokens to improve use by other programs. For instance, where authorship tokens are hidden or stored elsewhere (e.g., in another file), they can be unhidden or otherwise added to content being exported. In such a manner, a program that will receive the content can obtain the authorship information in a readily accessible manner. Where authorship tokens are obfuscated (e.g., hashed or encrypted), the authorship token can be decrypted or otherwise converted into a format that is easier for other programs to use.

Following operation 284, the flow of the method can move to operation 286.

Operation 286 includes exporting the modified content. This can include ensuring the content being exported in the manner determined in operation 282 is modified according to operation 284.

Operation 292 can include determining that content is being imported into the text editor 12, such as into the file 112. Content importation can include detecting a paste operation is occurring, detecting that content is being dragged into of the file 112, detecting that an import operation is selected from a menu of the text editor (e.g., a function called "import"), detecting other importation occurrences, or combinations thereof. In an example, detecting such operations includes using one or more APIs of an operating system on which the text editor 12 is running. In addition or instead, this can include detecting user input corresponding to importing data. The detecting can include detecting a particular operation within the text editor is being activated. Detecting can occur in other ways too. In some instances, the text editor 12 includes a special import option that relates to authorship data, and determining that content is being imported can include detecting that such a special option was activated. Following operation 282, the flow of the method can move to operation 294.

Operation 294 includes modifying the content being imported. The modification can take any of a variety of forms. Authorship tokens can be removed from the content being imported. Authorship tokens can be added to content being imported. For example, an authorship token of the region from which the content is being exported is added to the content being imported. Modifying the content can include removing content associated with particular authorship. For example, the content being imported may include multiple different kinds of authorship (e.g., human, artificial, internal, or external, among others). An entity controlling the text editor 12 may have policies regarding whether content having a particular kind of authorship can be imported. Thus, the content can be modified to remove content having authorship that is not permitted to be imported (e.g., content from outside of the organization). In some examples, the content is modified to indicate that certain content was not included.

In some examples, this includes treating the importation as an edit and analyzing its significance. If the importation is significant, then an authorship token for the imported content is determined and added. In some instances, the authorship token simply indicates that the content is obtained from an external source or has unknown authorship. In some examples, authorship is determined based on existing authorship tokens in the content being imported. In some examples, authorship is determined based on analyzing the source of the content. For example, the content may be from a website or file and the nature of the importation process may indicate such a location (e.g., a uniform resource locator or identifier of the source). That indication can be analyzed and used as an author. For instance, the domain of the URL can be used as the author. In other examples, an artificial intelligence is applied to the source and used to determine whether that source includes an indicia of authorship and then that is used. In some examples, the entire source designator is used as an author. In some examples, a human or an artificial agent (e.g., a program running or using a large language model trained or configured to take such an action) follows the source designator (e.g., URL) and with the benefit of knowing what content is being imported (e.g., based on the content of the clipboard), can investigate the source and determine the authorship of the content. Where the content is from a blog post or a comment, the author of the comment or blogpost can be indicated as the author. Where the content is from another file that file or surrounding files in a hierarchy can be analyzed to determine authorship (e.g., based on the content of a readme file, a licensing file, metadata of files, other indicators, or combinations thereof). Where the content is from a source repository, a history of the repository can be analyzed to determine the author of the change (e.g., using git blame or another feature). The resulting determination of authorship can be used to create an authorship token. In some examples, the authorship token may include known and unknown information. For instance, a name of the author may be included but it may be unknown whether that author is the true author or whether that author used an artificial intelligence to generate it. An indication of such a lack of knowledge may be added. In some instances, human versus artificiality can be determined based on the date on which the content was first published or otherwise created. Prior to a certain date, it may be assumed that all content was human authored rather than potentially generated by an artificial intelligence. In some instances, a user or an organization may prefer to label information obtained external to the organization with an "external" label or treat is as being "artificial" rather than human generated for copyright, auditing, or other purposes. The human or artificial agent may determine whether the content is from an internal or external source depending on the source location (e.g., a local file, an intranet website, or an external website) and cause a corresponding authorship token to be generated.

In some examples, modifying the content can include rewriting the content with a large language model or having a human author manually edit the content such that authorship of the content being imported corresponds to a new author. For example, sufficient modifications can be made to transform authorship of the content. Sufficiency of the modifications can be determined using the same or similar techniques described above in relation to operation 220. In some examples, the modifications can include converting the content to a format or style preferred by the user of the text editor.

In some examples, modifying the content can include adding or modifying authorship tokens. For instance, the content may include authorship tokens in a different format from a format used in the file 112. The authorship tokens may be converted from a first format to a second format and the content modified to include the authorship token in the second format. In an example, the authorship tokens may be removed from the content being imported and be hidden or stored elsewhere (e.g., in another file). Where authorship tokens of the file 112 into which the content is imported are obfuscated (e.g., hashed or encrypted), the authorship tokens of the content being imported can be encrypted, hashed, or otherwise converted into the format used by the file.

Following operation 294, the flow of the method can move to operation 296.

Operation 296 can include importing the modified content. This can include adding the modified content to the file 112.

Many examples herein describe application of authorship tokens to content edited by a text editor. However, authorship tokens can be applied to in other contexts, such as using visual or other kinds of editors. For example, a user may cooperate with an artificial intelligence in the creation of visual content (e.g., a website or a user interface) using a visual development environment (e.g., a graphical user interface builder). The visual development environment may permit a user to specify locations for graphical user interface elements. In examples, techniques described in FIG. 2 may be modified to apply to such situations. For example, edits to content can be detected, significance determined, and authorship tokens provided accordingly. Likewise, techniques described herein can be applied in other contexts, such as audio creation or editing, visual content creation (e.g., 2D images, 3D objects, photographs or video,) In some implementations, authorship tokens can be applied upon creation of content using sensors (e.g., cameras or microphones) and can persist through the editing journey of the content to demonstrate provenance of the content, optionally including a description of who edited or contributed to what aspect of the content.

In an example, to improve auditability of authorship, a generative artificial intelligence is configured to generate content that has an increased likelihood of being detected as having been generated by an artificial intelligence. For example, the generative artificial intelligence can be configured to have a statistically significant detectable feature unlikely to be produced by humans, such as favoring content having a specific number of syllables, consonants, vowels, or other detectable features. In another example, the generative artificial intelligence can be configured to favor use certain words, types of words or forms of words or sentences. In example, existing code produced by a human author is analyzed to determine such traits and then the generative artificial intelligence is configured to generate to content that is detectably different from such traits. Thus, sections of content produced by the generative artificial intelligence can be distinguished from content produced by a human author.

In another example, to improve the auditability of authorship, a generative artificial intelligence can be configured to produce code having variables or functions with names that are less likely to be produced by a human author. For example, the artificial intelligence can be configured to favor producing variables having longer variable names (e.g., appending "_AI_GENERATED" to variable or function names produced by an artificial intelligence) or having special characters that are inconvenient for a human to manually type. In an example, the generative artificial intelligence is trained or configured to produce names that would be considered ugly or too verbose by a human programmer. Thus, code produced by human versus an artificial intelligence could be distinguished.

Example Text Editor

Figure 3:
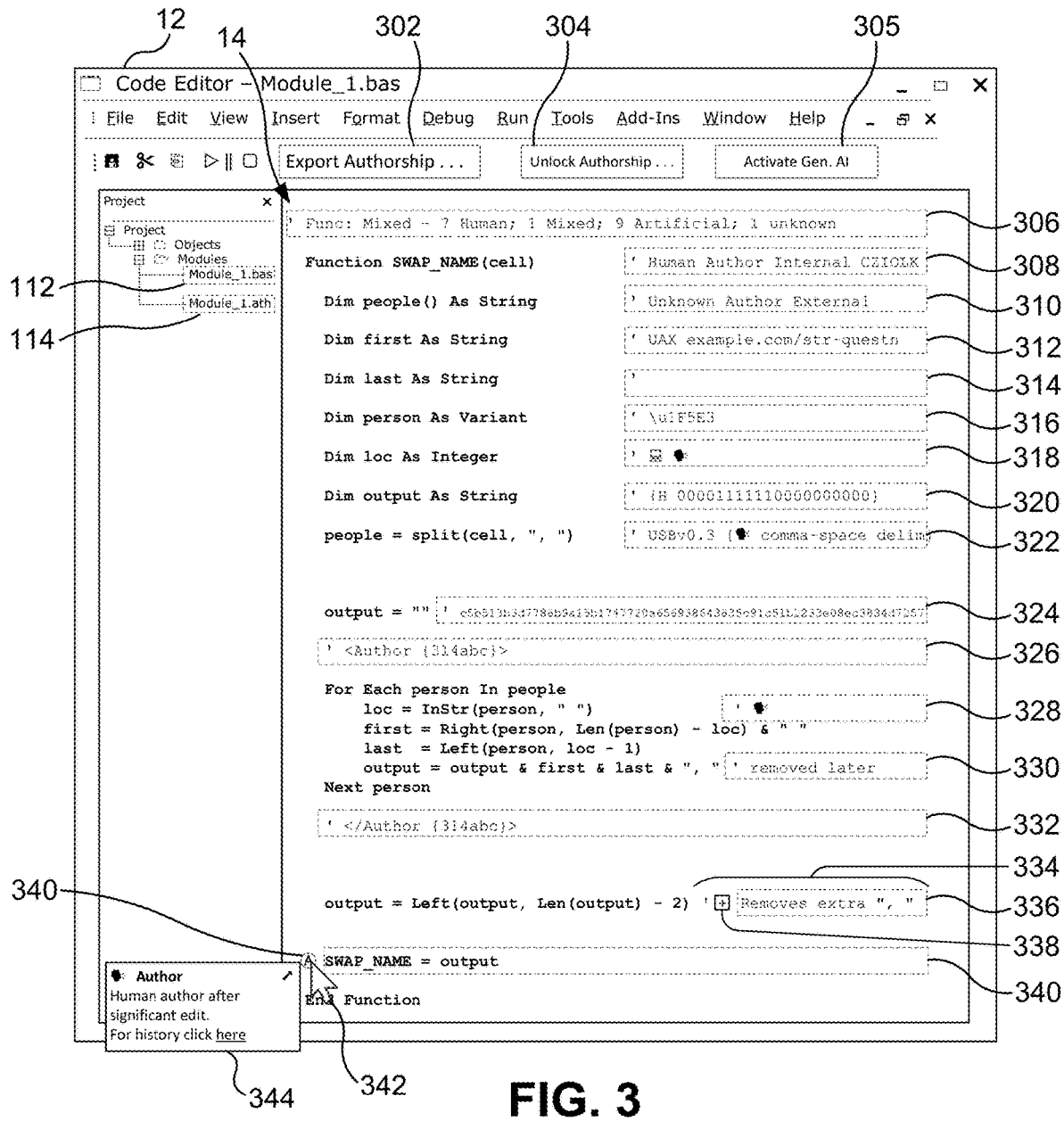
FIG. 3 illustrates an example text editor displaying a file having source code content that includes comments with varying styles of authorship tokens.

FIG. 3 illustrates an example text editor 12 displaying a file 112 having source code content 14 that includes comments 16 with varying styles of authorship tokens. Here, the file is a visual basic file where comments begin with a ' and continue until the end of the line. Source code content 14 is bolded and comments are not bold. In many implementations, a single file 112 would likely have a small number of different kinds of authorship tokens. The variety of token formats here is for example purposes only showing some of the various ways that authorship tokens can be provided.

User interface element 302 is a button that, upon activation, causes the text editor 12 to export the content 14 in a manner that preserves authorship tokens, such as in the way described in relation to operation 282.

User interface element 304 is a button that, upon activation, causes the text editor 12 to unlock editing of authorship tokens. For example, the text editor 12 may selectively lock and unlock editing of authorship tokens. When locked, the text editor prevents a user from editing portions of the content 14 that correspond to authorship tokens. When unlocked, the text editor permits a user to edit the portions of the content 14 that correspond to authorship tokens. In some implementations, the text editor 14 may require the user to demonstrate sufficient permission to unlock the editing (e.g., based on a role or status of the user or based on the user providing a password). In some instances, unlocking, locking, or editing authorship tokens may be logged in a logging system so that manual changes to authorship can be audited. In some examples, the user may be required to provide a reason for the change to authorship, that may or may not need to be approved. In some implementations, where the authorship token is designed to resist mimicry (e.g., by hashing or otherwise obscuring the authorship tokens), unlocking the authorship tokens may un-obfuscate the authorship tokens. After modification of the formerly obfuscated authorship token, the text editor may re-obfuscate the authorship token.

User interface element 305 is a button that, upon activation, causes the text editor 12 to activate a generative AI function to generate content 14 within the text editor 12. For example, when the generative AI function is enabled, generative AI may suggest new content to the user at the location of the cursor within the text. That may be the same cursor location where human text input would be provided if entered via a human interface device of the computer on running the text editor 12. In addition or instead, actuation of the button 305 may create a user interface element configured to provide a generative AI chat interface with the user for responding to user prompts. Depending on whether and how the feature is implemented and how the user interacts with the feature, information can be provided to the editor 12 or an authorship engine to facilitate the addition of authorship tokens to the data.

Comment 306 includes an authorship token in the form of "Func: Mixed—7 Human; 1 Mixed; 9 Artificial; 1 Unknown". The authorship token is a comment on its own line before a function that it describes. The authorship tokens indicates that it describes the region corresponding to the function (e.g., by stating "Func:") that begins on the following line (and ends with the line that reads "End Function"). The authorship token further designates that the region corresponding to the function has mixed authorship by stating "mixed". The authorship token indicates how many lines of code within the region have human, mixed, artificial, and unknown authorship (seven, one, nine, and one, respectively). In some examples, these numbers can automatically be updated when authorship of the lines within the region are changed. I Comment 308 includes an authorship token in the form of "Human Author Internal CZIOLK", which indicates that the author is a human author internal to the organization and having a user identifier of CZIOLK. In an example, the user identifier may be the user identifier of the human user that was associated with the text editor 12 (e.g., via a user account) when the associated region (line) was authored. The identifier of that user may be obtained and used as part of the human authorship token. In other instances, the user identifier of the human user may nonetheless be used even when there is an artificial author, such as for tracking or compliance purposes.

Comment 310 includes an authorship token in the form of "Unknown Author External", indicating that the line is from outside of the organization (e.g., copied and pasted from a website) and that the author of that region is unknown. The author may be unknown in the sense that the individual author is unidentifiable or that it is unknown whether the author was human or artificial. The authorship token may include additional content indicating as much.

Comment 312 includes an authorship token of the form "UAX example.com/str-questn". Here, "UAX" may indicate that there is an Unknown Author External to the organization and that the source of the content in the region (e.g., where the region was copied from in whole or in part) is the URL "example.com/str-questn".

Comment 314 includes an authorship token in the form of an empty comment. As described elsewhere, an empty comment may be, in some implementations, sufficient to constitute a human authorship token.

Comment 316 is a comment that includes an authorship token in the form of the Unicode symbol "Speaking Head in Silhouette" but in the form of the escape sequence "\u1F5E3". Some file types, text editors, or uses of the file 112 may not support Unicode characters directly and instead require them specified as a string literal. In some instances, the comment may include the string literal but the text editor 12 may instead replace the string literal with the symbol itself for the purposes of displaying to the user. Here, the Unicode symbol "Speaking Head in Silhouette" looks like a person talking and therefore can be used to represent human authorship, though of course various symbols can be used to represent various kinds of authorship. The use of symbols can be beneficial for use in authorship tokens because they are not usually found within source code comments (e.g., because of a relative difficulty in typing them, especially in the form of an escape sequence containing multiple characters that correspond to a single symbol).

Comment 318 is a comment that includes a two authorship tokens (or a single authorship token depending on how authorship tokens are implemented) in the form of a Unicode symbols "Old Personal Computer" and "Speaking Head in Silhouette", representing artificial and human authorship respectively. As discussed above, the symbols may be stored in the form of escape sequences but here are rendered by the text editor as individual Unicode symbols. The presence of both authorship tokens can indicate that the region is the product of mixed human and artificial authorship. The ordering of the tokens for the region can indicate a relative timing of the contributions. For example, the artificial authorship token being first can represent that the region was originally the product of artificial authorship and that human authorship was added after the artificial content.

Comment 320 is a comment that includes an authorship token in the form of "{H 00001111110000000000}", where the curly brackets indicate a block of text that is an authorship token (other symbols or characters can be used in other implementations). The H can indicate that human authorship is being described and the ones and zeros can indicate which sub-region (here, characters) of the region (here, line) have human authorship. Treating the ones as meaning that the corresponding character of the source code in the region as having human authorship and the zeros meaning that the corresponding character of the source code lacks human authorship, we can see that in the line "Dim output As String", the human authored the variable name and nothing else. The portions not having human authorship can be considered as having artificial authorship.

Comment 322 is a comment that includes an authorship token in the form of "USBv0.3", which indicates that artificial intelligence having the name "USB" and being version 0.3 is the author the region. The comment 322 further includes a portion enclosed in curly braces and having a symbol for "Speaking Head in Silhouette" followed by the comment "comma-space delim". The use of that symbol within the curly braces can be used to indicate that a human authored the portion of the comment "comma-space delim", which is a function comment describing the function of the region of code as requiring that the cell have names delaminated by a comma and then a space.

Comment 324 includes
c5b513b3d7788b9a15b1747720a656938643835c91c51b 2233e08ec3834d7257
which is a SHA256 hash of
H; SALT; output=" "
where H indicates human authorship, SALT is a salt, and output=" " is the line of code with an H appended at the beginning with a salt of the form "SALT", and with the parts of this separated by semicolons. Of course, other implementations can have different formats. In this manner, the token is obfuscated in a way that resists human or artificial mimicry.

Comment 326 is a comment before a for-each loop region and indicating a begin authorship tag having the form "<Author {314abc}>". An authorship token of this form may be used to indicate that all following regions of code (e.g., lines) until the closing tag (see comment 332) are authored by "314abc" unless otherwise indicated. 314abc may be an identifier of an author or may be a reference (e.g., key) to a region (e.g., value) within an authorship data file 114 associated with the file 112 that can be followed to understand more about the authorship of the region.

Comment 328 is a comment within the authorship region bounded by comments 326 and 332 that indicates that authorship of this particular line is by a human via the presence of a human authorship token in the form of a symbol of "Speaking Head in Silhouette".

Comment 330 is a comment within the authorship region bounded by comments 326 and 332. This comment 330 by itself says nothing about authorship (i.e., is not and does not include an authorship token). Instead, the comment is a functional comment describing non-authorship information about the region which it describes.

Comment 332 is a comment following the for-each loop region and indicating an end authorship tag having the form </Author {314abc}>. This authorship token can cooperate with the begin authorship tag of comment 326 to describe authorship.

Comment 334, which includes a first portion 338 and a second portion 336. The first portion 338 is a user interface element in the form of [+] that indicates to a user that, if actuated, the region can be expanded to reveal something. Here, that symbol can be used to indicate that the text editor 12 is not showing the entirety of the region, such as because the text editor 12 is hiding an authorship token (e.g., automatically hiding content having the form of an authorship token to prevent tampering or to resist cluttering the user's view of the content 140). Upon actuation, the text editor 12 can determine whether the user is permitted to view the hidden content and, if so, display the hidden content in line with the adjacent content that was not hidden. If the user is not permitted, the text editor 12 can display an error indicating as much and not display the hidden content. The second portion 336 can correspond to a non-authorship portion of the comment 334, such as a portion of the comment describing function of the region of code (e.g., that the line removes an extra portion of the output).

Line 340 of the content 14 lacks a comment but the editor 12 renders a symbol 342 near the line 340 indicating that there is authorship information about the line 340. For example, the authorship information for that line 340 may be stored in the form of an authorship token in the authorship token data file 114 rather than in an associated comment. The editor 12 can determine that there is associated information and render the symbol 342 so the user knows that they can hover over or otherwise interact with the symbol 342 to obtain more information. As illustrated, upon interacting with the symbol 342, a tooltip 344 is displayed. The tooltip 344 can display information about authorship of the associated region. In this case, the information is that there is human authorship after a significant edit and that an authorship history is available to the user upon clicking on a link within the tooltip.

Version Control System

Figure 4:
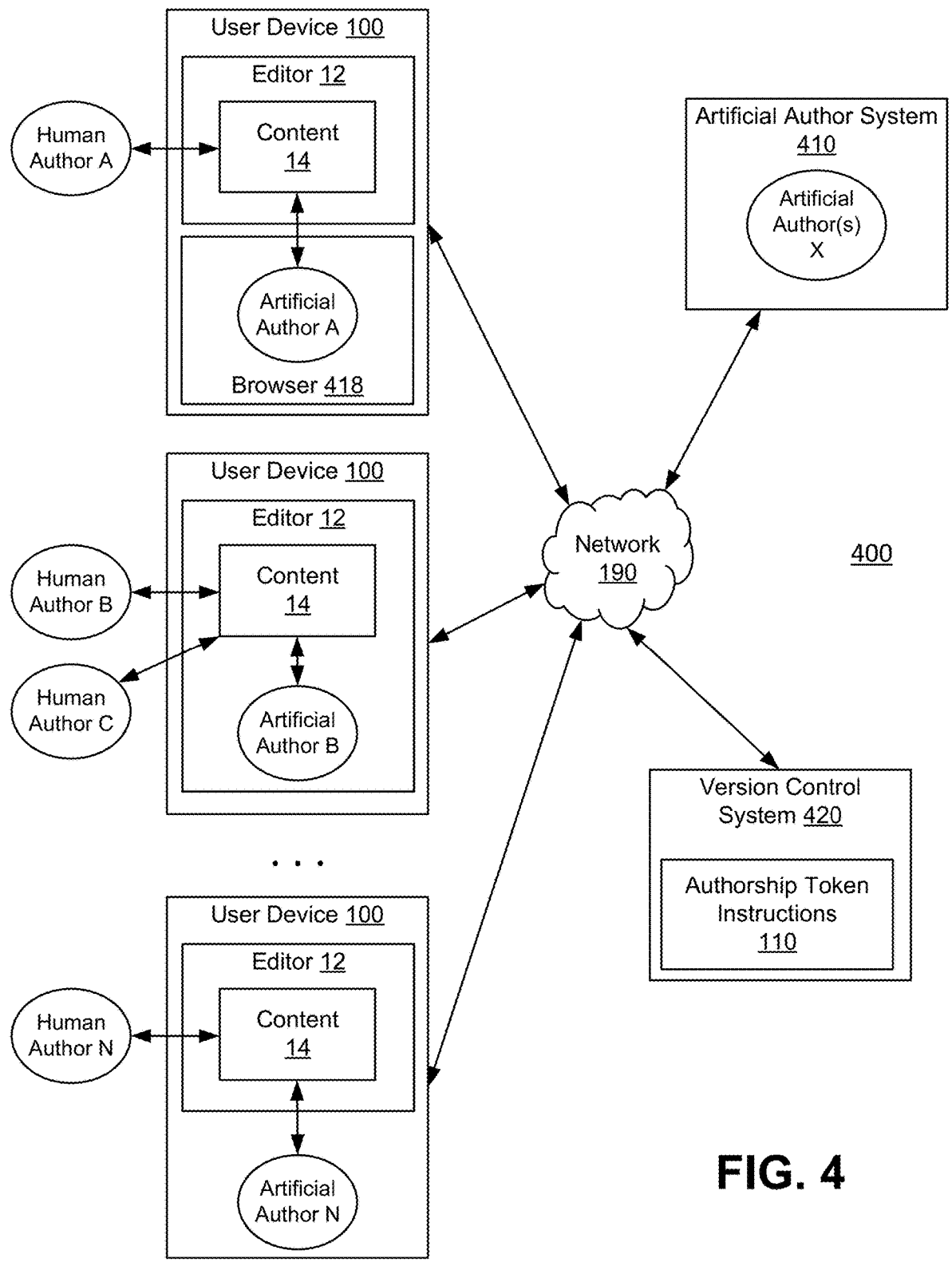
FIG. 4 illustrates an example system implementing aspects described herein.

FIG. 4 illustrates an example system 400 that can implement aspects described herein. The system 400 includes a plurality of user device 100, each having at least one human author and at least one artificial author editing content 14 in an editor 12 associated with respective user devices. The user devices are connected to an artificial author system 410 and a version control system 420 over the network 190.

Although the artificial authors are shown as being within the user devices 100 and can be running entirely or partially locally on the user devices 100, in addition or instead, the artificial authors may be running in whole or in part via a remote environment, such as the artificial author system 410. In some examples, the artificial authors are accessible through a browser 418 running on the user device.

The artificial author system 410 is a computing environment that provides one or more artificial authors remotely. Artificial authors often require significant computing resources (and concomitantly significant power and cooling resources) to operate in a timely manner. So they are often run on special purpose hardware or in other special conditions, such as those of the artificial author system 410. Capabilities of the artificial authors can be provided via application programming interfaces, web pages, via other techniques, or combinations thereof. The artificial author system 410 can include one or more aspects of the computing environment 600 described elsewhere herein.

The artificial authors are shown as having unique labels (A, B, . . . . N, and X) and can indeed be unique with respect to each other. For instance, the different artificial authors may be different generative artificial intelligence models (e.g., one may be a CHATGPT model provided by OPENAI and another may be a LLAMA model provided by META), may be different versions of a same model, may be different fine tunings of a same model, may have different initial system prompts, may have different custom parameters, other differences, or combinations thereof. But in some examples, the artificial authors across two or more user devices 100 may be the same or may be labeled as being a same artificial author. For example, the user devices 100 may access a same artificial author system and receive content from a same or substantially the same artificial author. In such instances, an authorship engine may be configured to treat content produced by such an artificial author as being produced by a same artificial author. But in other examples, an authorship engine may nonetheless treat a same artificial author operated, controlled, supervised, or otherwise used at different user devices 100 as being different artificial authors.

The version control system 420 is a system made up of one or more computing environments (e.g., computing environment 600) that provide version control functionality. Version control can relate to the management of content and changes thereto, especially by multiple different users. The version control system 420 can receive and store content created by the one or more different user devices 100 (e.g., via an editor 12 thereof). The version control system 420 can load and send content to the various user devices 100 for editing, viewing, or other purposes. The version control system can manage a content repository and handle simultaneous editing of content (e.g., using a merge model, a lock model, or other models of concurrency). The version control system 420 can provide functionality for tracking changes to content managed by the version control system. While the version control system 420 is illustrated as being separate from the user devices, some implementations of version control systems involve version control software operating on user devices 100 in addition to or instead of remotely. Example version control systems 420 include GIT, MERCURIAL, PERFORCE, SVN, others, or combinations thereof. The version control system 420 can include or cooperate with source code or other content repositories, such as BITBUCKET, GITHUB, GITLAB, AZURE DEVOPS, others, or combinations thereof.

The version control system 420 can include authorship token instructions 110 that, when executed by one or more processors of the version control system, cause the version control system 420 to perform one or more operations relating to authorship tokens. The operations can include those described elsewhere herein. In some examples, the authorship token instructions 110 can include those specific to use with a version control system.

In an example, the authorship token instructions 110 cause the version control system 420 to track changes to a maintained code base depending on authorship of the changes to the content 14. For example, the version control system 420 can maintain a change history of the content 14. The change history can include not only an indication of the changes themselves and the user that submitted the change, but also the authorship of the change. The authorship of the change can be determined based on the authorship tokens 18 of the content 14 associated with the change. For example, the version control system 420 can parse the content 14 of the change being submitted and identify the presence or absence of authorship tokens 18. The version control system 420 can then parse those authorship tokens 18 and store information about that authorship in association with the change. Such information can include a number or percentage of regions (e.g., lines of code) having particular authorship.

The authorship token instructions 110 can cause the version control system 420 to restrict changes to particular portions of a code base or other content based on authorship. For instance, an organization can set a policy regarding a relative amount of content having particular authorship and the authorship token instructions 110 can prevent changes that go against that policy. For instance, there may be a policy prohibiting any non-human authored content in a particular file or branch. The version control system 420 can then prohibit the committing or merging of a particular change or branch if the content 16 includes artificial authorship. In an example, the version control system 420 would permit a change by a user had the change included only human authorship tokens but prohibited a change by that same user had the change included an artificial authorship token.

In an example, the version control system 420 provides a user interface showing content to a user. In some examples, the user interface preserves the authorship tokens 18. In other examples, the user interface removes the authorship tokens 18 or otherwise inhibits the display of the authorship tokens 18 in the view. This can be done to remove visual clutter, improve readability, enhance privacy, or for other reasons. The version control system 420 can achieve this by identifying sections of the content 16 matching a known format of authorship tokens 18 and preventing the display of such sections of content. In addition or instead, the user interface can include a separate region that indicates authorship (e.g., a column by a line number column that includes one or more symbols indicating authorship of the associated region).

Figure 5:
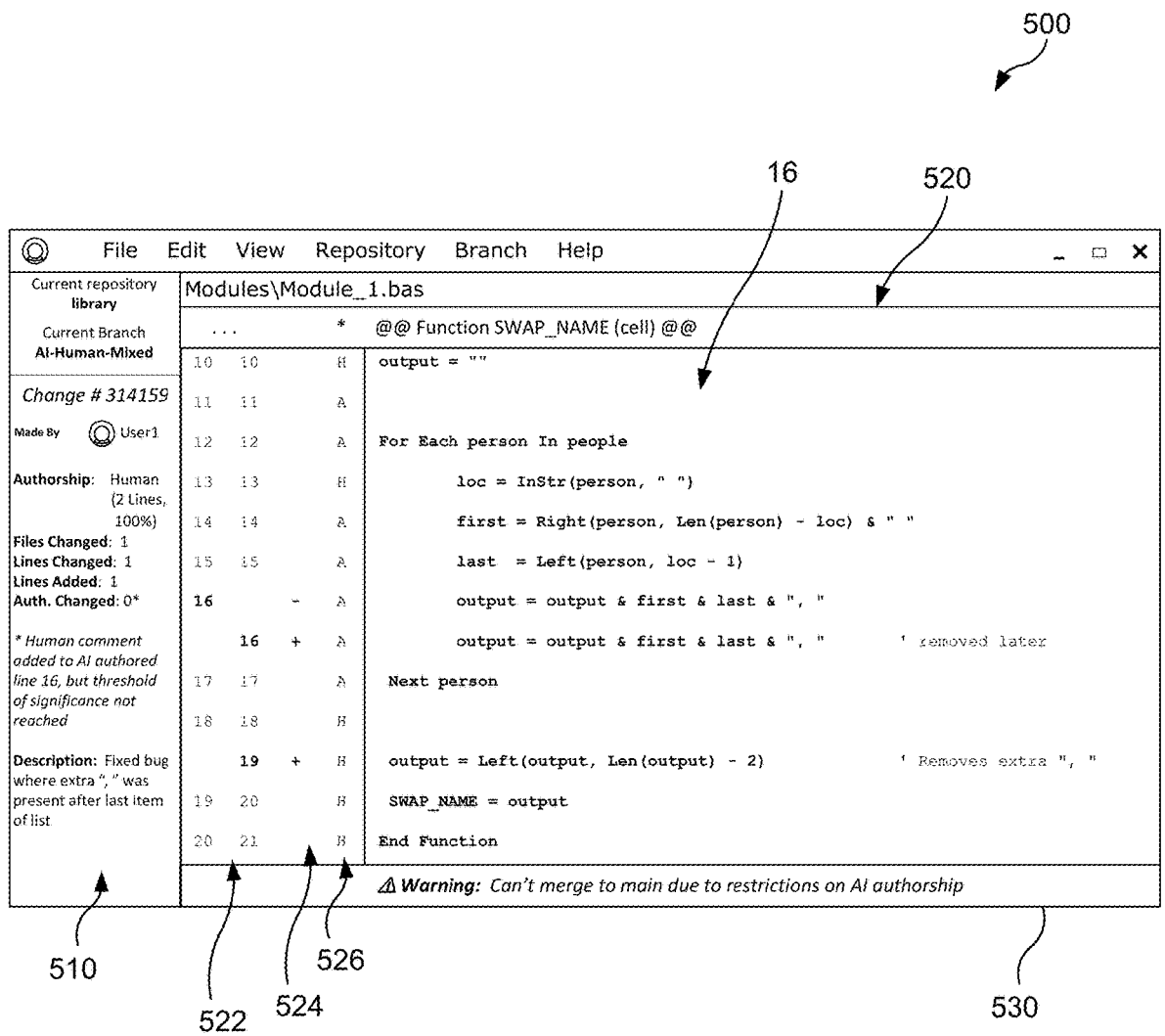
FIG. 5 illustrates an example user interface showing a change to content.

An example user interface associated with changes to a code base is shown in FIG. 5.

Change View

FIG. 5 illustrates an example user interface 500 showing a change to content 16. The user interface 500 includes a change information portion 510 and a content view 520. The user interface 500 further includes a warning 530 indicating that due to the presence of artificial authorship, the content 16 cannot be merged to a main branch of content 16.

The change information portion 510 illustrates information about a change to content 16 that is being displayed in a content view 520. The portion 510 includes an identifier of the change (e.g., Change #314159), the name of the user that made the change (e.g., User1), the authorship of the change (e.g., human, artificial, or mixed), an indication of the regions associated with the authorship (e.g., 2 lines of human authorship accounting for 100% of the changed content 16), a number of files changed, a number of lines changed, a number of lines added, how much authorship has changed (e.g., how many regions have changed from a first kind of authorship to a second kind of authorship), a description of the change, other information, and combinations thereof. As illustrated, the change information portion 510 can further include information about determinations of authorship. For example, as illustrated, the portion 510 indicates "Human comment added to AI authored line 16, but threshold of significance not reached".

The content view 520 is a portion of the user interface 500 that shows content 16. As illustrated, the content 16 is code based on that shown in FIG. 3. The view 520 includes indications of line numbers 522, changes 524 made by the change, and an authorship column 526. The authorship column 526 indicates, for an associated region (in this case, lines of content 16), authorship. Here, the column 526 includes an "H" indicating human authorship of the associated line and an "A" indicating artificial authorship of the associated line. In other examples, other symbols or indications can be used.

Authorship View

Figure 6:
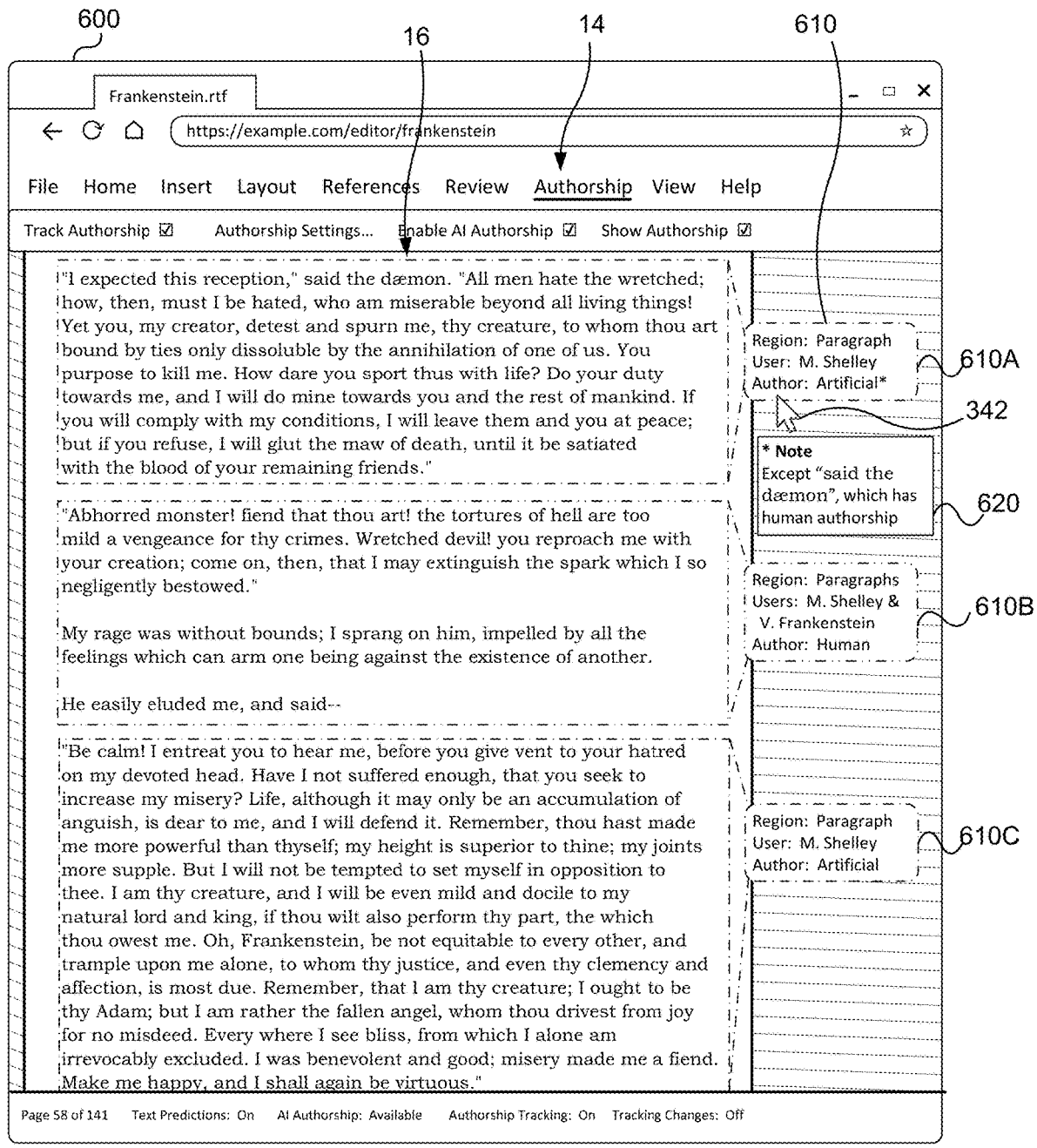
FIG. 6 illustrates an example web browser (e.g., running on a user device) rendering a web page that provides a text editor for editing content and viewing authorship information.

FIG. 6 illustrates an example web browser 600 (e.g., running on a user device 100) rendering a web page that provides a text editor 12 for editing content 14 and viewing authorship information. Here, the content 14 is prose text content that has the authorship of the content tracked (e.g., in a separate file or in another area beyond the plain text of the content 14). The editor 12 provides a view for reviewing the content. As illustrated, the view is a user interface having particular regions of content visually distinguished (e.g., by placing the region in a box) and associated with user interface elements 610 describing authorship information of the region. For example, the editor 12 shows three regions of content 16 that are all by a same user but having different authorship. For instance, one of the user interface elements 610A describes a single paragraph region by the user "M. Shelley" and which is authored by an artificial author (without specifying which artificial author). The artificial authorship indication of element 610A is accompanied by an asterisk, which can be used to indicate that there is additional information about the determination of authorship. When a user hovers over or otherwise interacts with the element 610A, a tooltip 620 appears providing additional information. In the illustrated example, the additional information is that all of the content 16 of the region has artificial authorship except for the phrase "said the dæmon", which has human authorship. User interface element 610B refers to multiple paragraphs and indicate that they have human authorship provided by two different users. User interface element 610C refers to a single paragraph region having artificial authorship and provided by user "M. Shelley".

Attributing Authorship from Conversation

Figure 7A:
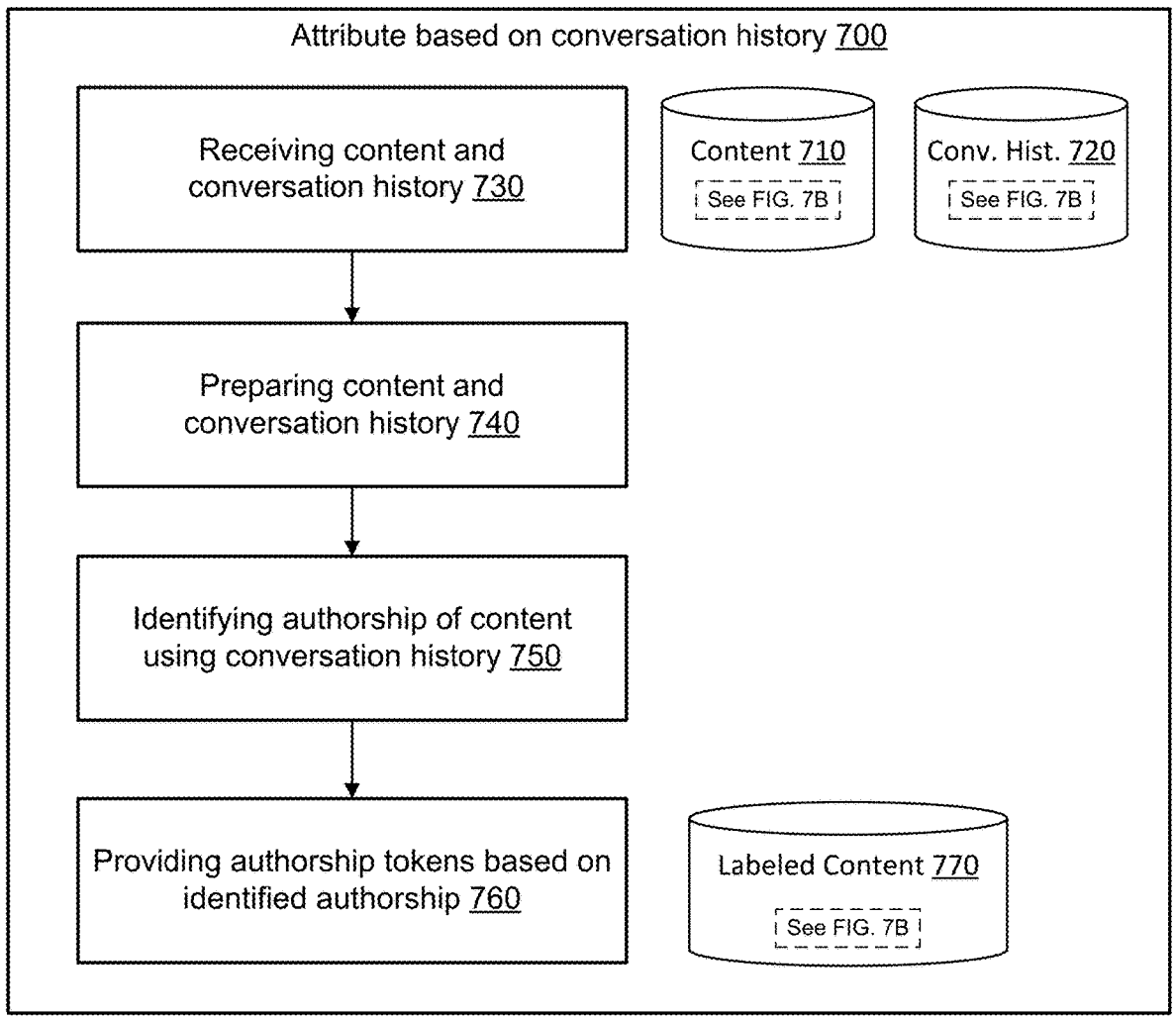
FIGS. 7A and 7B, illustrates a method for attributing authorship of content based on a conversation history.
Figure 7B:
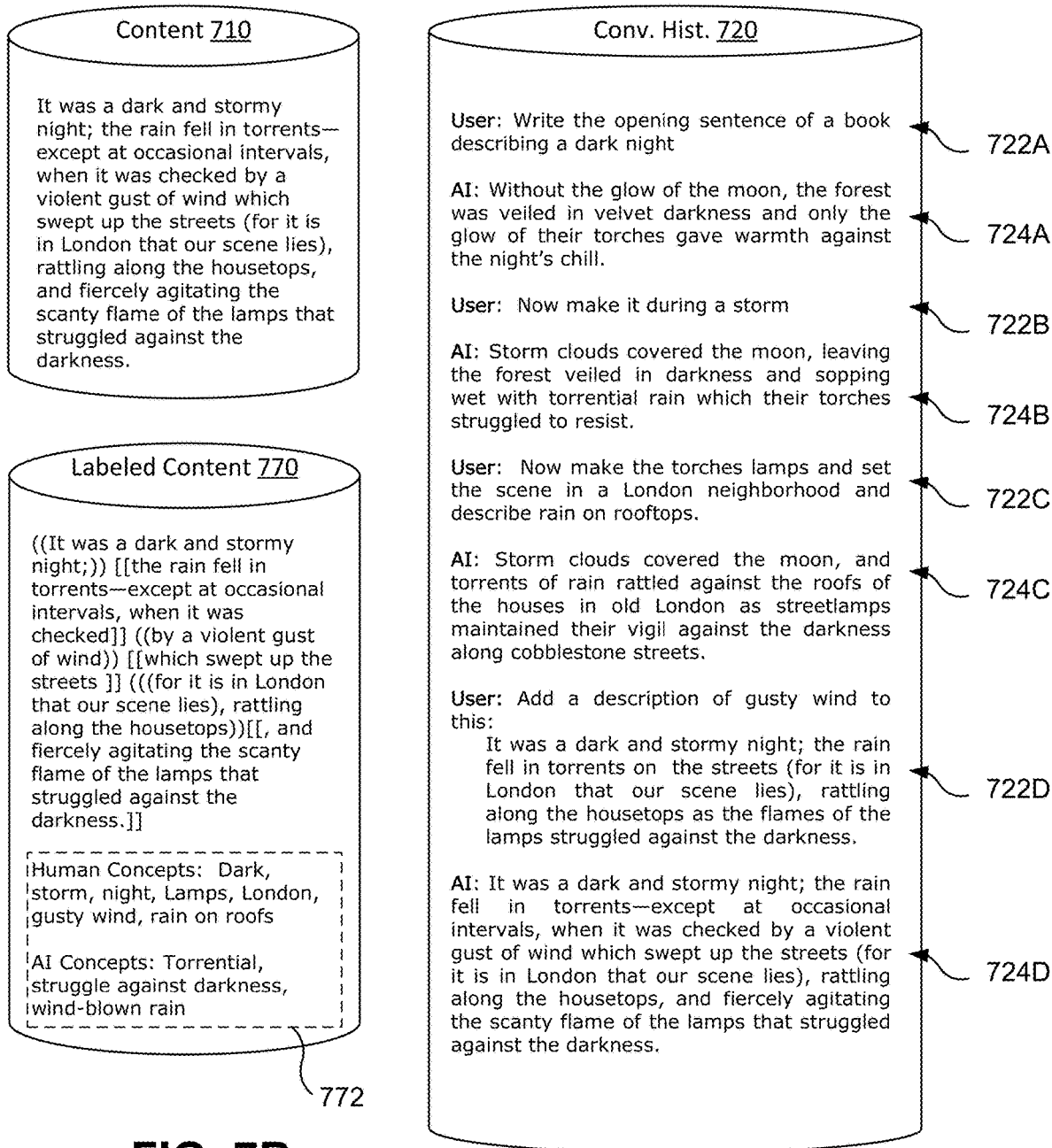

FIG. 7, which is broken into FIGS. 7A and 7B, illustrates a method 700 for attributing authorship of content 710 based on a conversation history 720. The content 710 is visual, textual, audio, or other kinds of content. In the illustrated example, the content 710 is narrative text and lacks one or more authorship tokens indicating the provenance of different regions of the content 710. The conversation history 720 is a representation of a conversation among two or more artificial or human authors. In many examples, the conversation history 720 is a text representation of messages. In other examples, the conversation history is an audio or visual representation of the interactions between the authors. In the illustrated example, the conversation history 720 is in the form of a transcript of a text chat between a human user and an AI chatbot. During the conversation, the human user sends human messages 712 that are responded to with AI messages 714. The method 700 can begin with operation 730.

Operation 730 includes receiving the content 710 and the conversation history 720. This operation 730 can take any of a variety of forms. In some examples, one or both of the content 710 and history 720 are in one or more separate files that are received (e.g., by receiving indications of their locations, such as file paths). In some examples, one or both of the content 710 and history 720 is present in an editor 12 (e.g., in a main editing user interface or pasted within a field of a user interface of the editor 12). Following operation 730, the flow of the method 700 can move to operation 740.

Operation 740 includes preparing one or both of the content 710 and conversation history 720 for use. In an example, this includes parsing the conversation history and identifying one or more authors in the conversation history 720 and associated messages. In some examples, the conversation history 720 is analyzed to identify a prompter and a generator and the roles are used in assessing authorship in future operations. Following operation 740, the flow of the method 700 can move to operation 750.

Operation 750 includes identifying authorship of regions of the content 710 based on the conversation history 720.

Identifying authorship can include determining a difference between messages provided by a first author and a region of the content 710. If the difference is below a predetermined threshold, then the region is labeled as having the first author as an author.

Identifying authorship can include taking a piece of the content 710 and recursively finding the provenance of the portions of the content 710. For example, the content 710 may include a region that is verbatim (or within a predetermined amount of difference) provided by a second author. An authorship engine can then go backwards through the conversation history 720 to a prior message and find a difference between that content and the prior prompt by a first author. Regions corresponding to that difference can be labeled with the second author if the differences are significant (e.g., based on similar or the same determinations as operation 220) and labeled with the first author if the differences are not significant. This process of identifying differences and labeling authorship as needed can continue backwards through the conversation until the beginning of the conversation is reached.

In some examples, rather than moving backwards through the conversation, the analysis can be performed by moving forward through the conversation. In an example, a difference between an earliest relevant message and a next message is be determined. The significance of the difference can be determined (e.g., using techniques similar to those described above in operation 220) and authorship applied accordingly to the next message. After authorship is applied, the process of determining the difference and updating authorship continues for all next messages before finishing with the final difference between the last relevant message and the content 710 to be labeled.

In some examples, a branching nature of a conversation can be accounted for in the analysis. Part of the analysis can include determining the prior message or next message in the conversation. In many instances the prior or next message may be an immediately adjacent message, but in other instances, there may be intervening messages (e.g., as part of another conversation path or a tangent) between the current message and the prior or next message. Determining the prior or next message can include determining the most recent prior or next message chronologically that has the greatest similarity to the current message. This can include a straight comparison of text of the messages (e.g., using any of a variety of edit distance algorithms, such as Levenshtein distance algorithms). For instance, the message having the shortest edit distance to the current message can be determined to be the prior or next message when looking forward or backward as needed. In addition to or instead of edit distance, the distance in embedding space between a cluster of tokens of the messages can be used. Thus, the messages that are closest together in embedding space can be determined to be related. Other techniques can be used. A path from message to message (or topic to topic) through the conversation history can be determined by treating each message in the conversation history 720 as a node connected by edges having weights corresponding to the edit distance between the messages (or another technique). Then a path-finding algorithm (e.g., the A* algorithm) can be used to find a path through the messages from a start to a finish or until each node has been reached.

In some examples, a sentiment of a first author is analyzed to determine how much creative control the first author is exerting over the second author or additional other authors.

In some examples, the authorship engine can pass the conversation history and the content to a large language model or other artificial intelligence and ask whether particular portions of the content are authored by a given author.

In some examples, the authorship engine can modify the content 710 by removing contributions to the convent that were provided by (e.g., provided only by) a given author. This removal can be done using simple replacement or by using more complex approaches (e.g., asking an LLM or another artificial intelligence to do such a removal). The method 700 can then determine whether the change resulted in a significant difference, such as using one or more techniques described above in relation to operation 220.

In some examples, the content 710 is put into an embedding space with the conversation history and the points of the conversation history are labeled. The relative difference between one or more points or one or more clusters of points can be used to determine authorship.

Following operation 750, the flow of the method can move to operation 760.

Operation 760 includes providing authorship tokens for the regions based on the identified authorship, which can result in labeled content 770. The labeled content 770 includes indications of authorship in the form of authorship tokens. In the illustrated example, content written by humans is surrounded by double parentheses and content written by an artificial intelligence is surrounded by double square brackets. In addition, an authorship description 772 is provided that describes concepts provided by the human author and concepts provided by the artificial author.

Managing Use of Content Based on Authorship

Figure 8:
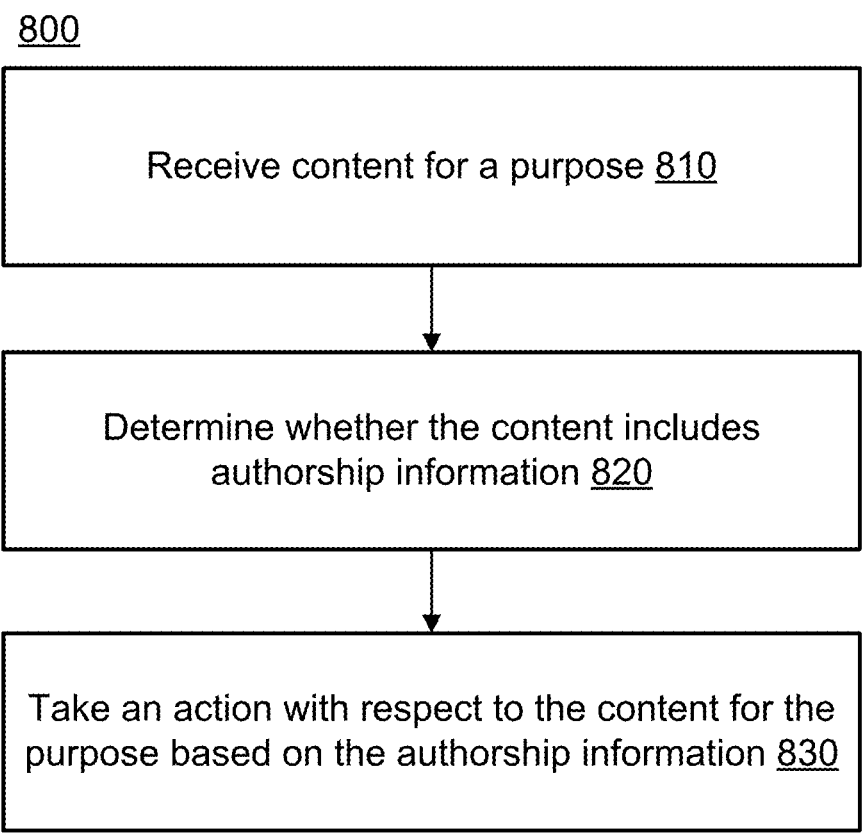
FIG. 8 illustrates an example method for using content based on its authorship.

FIG. 8 illustrates an example method 800 for using content based on its authorship. The method can begin with operation 810.

Operation 810 includes receiving content for a purpose. For instance, the content can be received through a form of a website or application, received via a paste command, received in an editor, received as a message, received over an application programming interface, or received in another way. Following operation 810, the flow of the method 800 can move to operation 820.

Operation 820 includes determining whether the content includes authorship information. This can be performed in any of a variety of ways. The authorship engine performing this method may have one or more supported authorship token formats and determine whether any of the content being received has content in that format. In some examples, the authorship tokens may be specifically identified or located in a different file or application programming interface call. In some examples, the authorship engine may determine a validity or a robustness of the authorship token. The validity or robustness may be based on how tamper resistant or verifiable the tokens are. For instance, a platform may have policies regarding which sources provide trusted authorship tokens (e.g., based on an ability to resist mimicry or as being certified as following particular standards for determining authorship). The trustworthiness of the provenance of the tokens may be used in the following steps. Following operation 820, the flow of the method 800 can move to operation 830.

Operation 830 includes taking an action with respect to the content for the purpose based on the authorship information. For example, the action may include determining whether the authorship information complies with policies regarding the use of content having that authorship for the purpose. For instance, certain websites, social networks, applications, communications systems, version control systems, or other platforms may restrict the receipt or use of artificially generated content for a purpose. Thus, the action may be prohibiting the use of the content if it has more than a threshold amount of artificially generated content or less than a threshold amount of human generated content. In some actions, different purposes may control whether or how the authorship information is used to permit or deny use of the content. For instance, a platform may prohibit the use of artificially generated content in advertisements but not non-commercial user posts. In some examples, the platform may flag the content (e.g., internally for content moderation purposes or in an externally facing way for users) as having a particular authorship or mix or authorship. Or it may flag the content has having unknown or unverified authorship. In some examples, the platform may use content having particular authorship for certain purposes but not others (e.g., only permit artificial intelligence training on human authored content).

In some examples, the platform is a social media platform having policies regarding authorship of content. In some examples, the platform may restrict the posting or sending of artificially generated content unless a user account specifically identifies itself as posting artificial content. In some examples, a platform may restrict the posting or sending of artificial content directed to a certain topic, such as elections. The platform may determine whether the post relates to an election and, if so, determine whether or to what extent the post is artificial.

In some examples, the platform may treat content having authorship tokens that do not follow certain standards or are not certified by a particular provider of authorship tokens believed to provide accurate or high quality authorship tokens as being less trustworthy. Such content may be demoted. For instance, if a platform is concerned about artificial content and a particular piece of content is received that has a human authorship token from an unreliable source, then the content may be treated as having artificial authorship or as having unknown authorship even though the token says otherwise.

In some examples, the platform may treat content authored by an artificial intelligence as though it were not copyrighted and may treat content authored by a human as though it were copyrighted.

Video Editor with Authorship View

Figure 9:
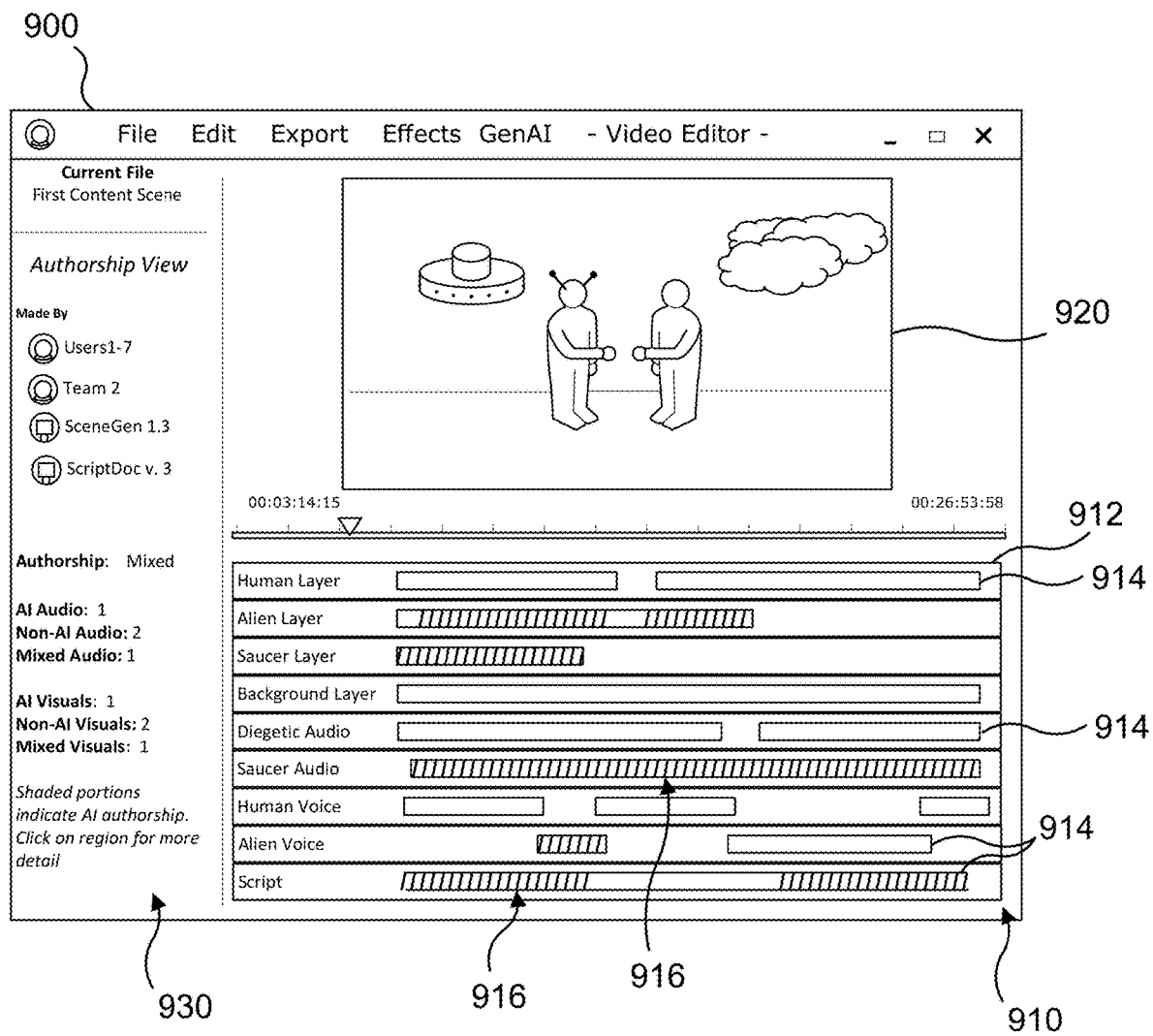
FIG. 9 illustrates an example video editor user interface having authorship attribution.

FIG. 9 illustrates an example video editor user interface 900. While many examples herein describe authorship tokens applied to text content, techniques described herein need not be so limited. Technology herein can be applied in other contexts as well. Illustrated is an example that applies authorship tokens to identify those portions of audio, visual, and textual (e.g., script of the video scene) content of a video that have artificial authorship versus human authorship. As illustrated, the user interface includes layer panel 910 that includes multiple layers 912, each having content 914 (e.g., audio or visual content) that make up a scene 920. The content 914 include portions shaded differently to serve as artificial authorship tokens 916 to identify artificial authorship (e.g., generated by a generative artificial intelligence).

The user interface further includes an authorship panel 930 showing a description of the authorship of the current file. This authorship panel 930 displays information regarding the human and artificial authors of the scene, as well as information regarding how much of different kinds of authorship make up the scene. The information provided here can be compiled based on the authorship information of each of the layers.

In examples, the software or services used to generate the layers 912 include authorship tokens during the creation of their respective content. When imported into the video editor, the editor can understand the authorship of the content (e.g., using techniques described in operations 292, 294, and 296) and apply authorship tokens accordingly.

Computing Environment

FIG. 10 discloses a computing environment 1000 in which aspects of the present disclosure may be implemented. A computing environment 1000 is a set of one or more virtual or physical computers 1010 that individually or in cooperation achieve tasks, such as implementing one or more aspects described herein. The computers 1010 have components that cooperate to cause output based on input. Example computers 1010 include desktops, servers, mobile devices (e.g., smart phones and laptops), wearables, virtual/augmented/expanded reality devices, spatial computing devices, virtualized devices, other computers, or combinations thereof. In particular example implementations, the computing environment 1000 includes at least one physical computer.

The computing environment 1000 may specifically be used to implement one or more aspects described herein. In some examples, one or more of the computers 1010 may be implemented as a user device, such as mobile device and others of the computers 1010 may be used to implement aspects of a machine learning framework useable to train and deploy models exposed to the mobile device or provide other functionality, such as through exposed application programming interfaces.

The computing environment 1000 can be arranged in any of a variety of ways. The computers 1010 can be local to or remote from other computers 1010 of the environment 1000. The computing environment 1000 can include computers 1010 arranged according to client-server models, peer-to-peer models, edge computing models, other models, or combinations thereof.

In many examples, the computers 1010 are communicatively coupled with devices internal or external to the computing environment 1000 via a network 1002. The network 1002 is a set of devices that facilitate communication from a sender to a destination, such as by implementing communication protocols. Example networks 1002 include local area networks, wide area networks, intranets, or the Internet.

In some implementations, computers 1010 can be general-purpose computing devices (e.g., consumer computing devices). In some instances, via hardware or software configuration, computers 1010 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1010 include one or more processors 1012, memory 1014, and one or more interfaces 1018. Such components can be virtual, physical, or combinations thereof.

The one or more processors 1012 are components that execute instructions, such as instructions that obtain data, process the data, and provide output based on the processing. The one or more processors 1012 often obtain instructions and data stored in the memory 1014. The one or more processors 1012 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1012 include at least one physical processor implemented as an electrical circuit. Example providers processors 1012 include INTEL, AMD, QUALCOMM, TEXAS INSTRUMENTS, and APPLE.

The memory 1014 is a collection of components configured to store instructions 1016 and data for later retrieval and use. The instructions 1016 can, when executed by the one or more processors 1012, cause execution of one or more operations that implement aspects described herein. In many examples, the memory 1014 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1014 can store information encoded in transient signals.

The one or more interfaces 1018 are components that facilitate receiving input from and providing output to something external to the computer 1010, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1018 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1018 can facilitate connection of the computing environment 1000 to a network 1090.

The computers 1010 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 11:
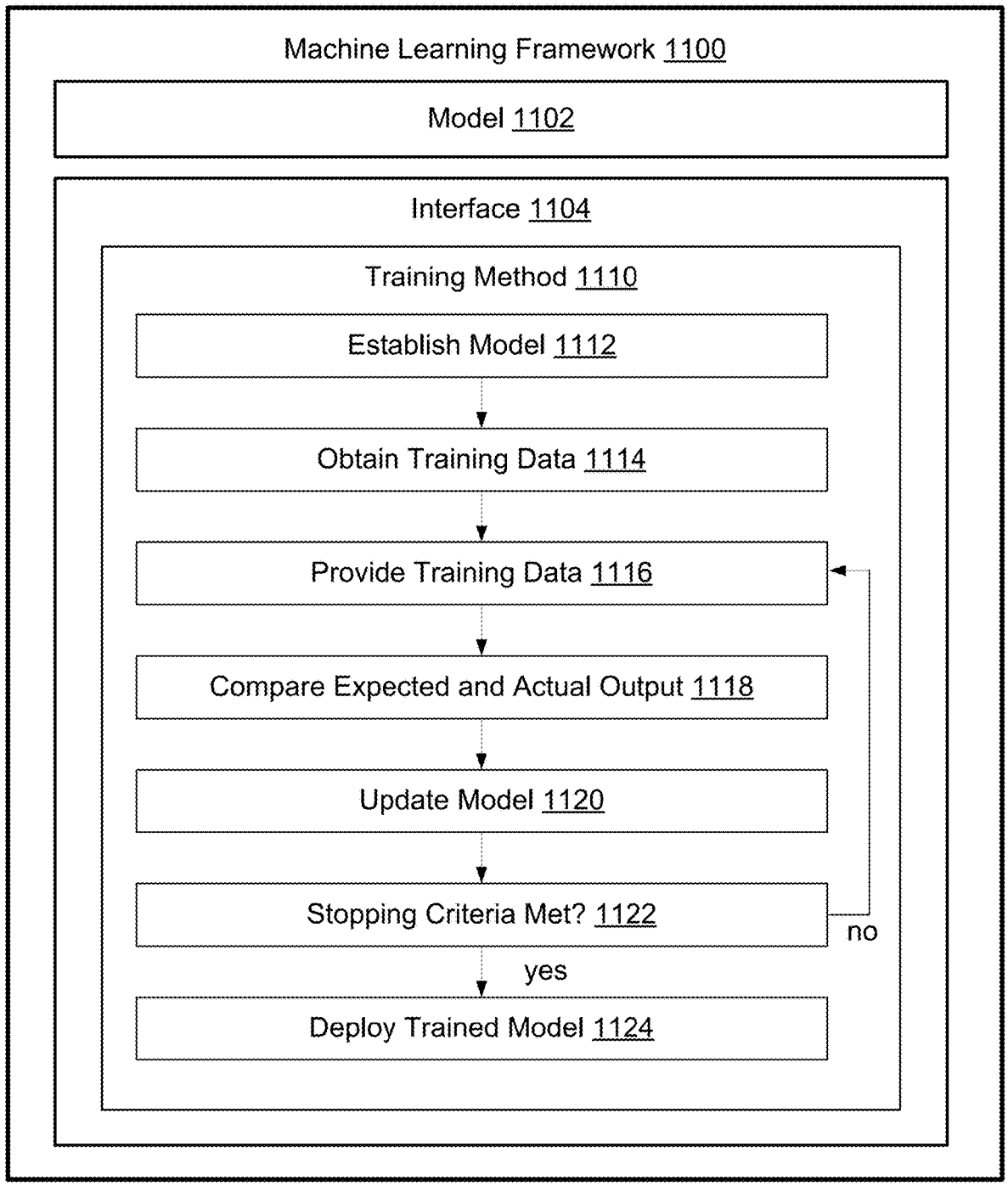
FIG. 11 illustrates an example machine learning framework that can benefit from or be used with techniques described herein.

FIG. 11 illustrates an example machine learning framework 1100 that techniques described herein may benefit from. A machine learning framework 1100 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1100 or components thereof are often built or refined from existing frameworks, such as TENSORFLOW by GOOGLE, INC. or PYTORCH by the PYTORCH community.

The machine learning framework 1100 can include one or more models 1102 that are the structured representation of learning and an interface 1104 that supports use of the model 1102.

The model 1102 can take any of a variety of forms. In many examples, the model 1102 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1102 can include a representation of memory (e.g., providing long short-term memory functionality). Where the set includes more than one model 1102, the models 1102 can be linked, cooperate, or compete to provide output.

The interface 1104 can include software procedures (e.g., defined in a library) that facilitate the use of the model 1102, such as by providing a way to establish and interact with the model 1102. For instance, the software procedures can include software for receiving input, preparing input for use (e.g., by performing vector embedding, such as using Word2Vec, BERT, or another technique), processing the input with the model 1102, providing output, training the model 1102, performing inference with the model 1102, fine tuning the model 1102, other procedures, or combinations thereof.

In an example implementation, interface 1104 is used to facilitate a training method 1110 that can include operation 1112. Operation 1112 includes establishing a model 1102, such as initializing a model 1102. The establishing can include setting up the model 1102 for further use (e.g., by training or fine tuning). The model 1102 can be initialized with values. In examples, the model 1102 can be pretrained. Operation 1114 can follow operation 1112. Operation 1114 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1102. Operation 1116 can follow operation 1114. Operation 1116 includes providing a portion of the training data to the model 1102. This can include providing the training data in a format usable by the model 1102. The framework 1100 (e.g., via the interface 1104) can cause the model 1102 to produce an output based on the input. Operation 1118 can follow operation 1116. Operation 1118 includes comparing the expected output with the actual output. In an example, this includes applying a loss function to determine the difference between expected and actual. This value can be used to determine how training is progressing. Operation 1120 can follow operation 1118. Operation 1120 includes updating the model 1102 based on the result of the comparison. This can take any of a variety of forms depending on the nature of the model 1102. Where the model 1102 includes weights, the weights can be modified to increase the likelihood that the model 1102 will produce correct output given an input. Depending on the model 1102, backpropagation or other techniques can be used to update the model 1102. Operation 1122 can follow operation 1120. Operation 1122 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1114. If the stopping criterion has been satisfied, the flow can move to operation 1122. Operation 1122 includes deploying the trained model 1102 for use in production, such as providing the trained model 1102 with real-world input data and produce output data used in a real-world process. The model 1102 can be stored in memory 1014 of at least one computer 1010, or distributed across memories of two or more such computers 1010 for production of output data (e.g., predictive data).

Application of Techniques

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. While various factors are described as weighing in favor of or against certain findings of authorship, a person of skill in the art will recognize that the various factors and weightings described herein can be applied in any of a variety of ways (and with any of a variety of different weightings themselves) to achieve a desired outcome.

What is claimed is:

1. A computer-implemented method of attributing authorship in content, the computer-implemented method comprising:
    determining that an author made an edit to a region of content using a content editor, wherein the region is a line-level region, a lexical scope, a function-level region, a class-level region, a file-level region, a word-level region, a sentence-level region, or a paragraph-level region;
    determining that the edit satisfies a threshold of significance, wherein determining that the edit satisfies a threshold of significance includes determining that the edit is to code functionality or changes more than a predetermined threshold number of percentage of characters or words within a portion of the region of the content other than comments, including calculating a significance score and determining that the significance score satisfies a threshold; and
    responsive to determining that the edit satisfies the threshold of significance, providing an authorship token in association with the region, the authorship token having a predetermined form indicating that the author of the region is either (1) a human rather than an artificial intelligence or (2) an artificial intelligence rather than a human, wherein the predetermined form is based on whether the author is human or is an artificial intelligence,
    wherein calculating the significance score includes accounting for an output of the performance of one or more operations selected from the group consisting of:
        determining whether one or more comments have been modified;
        determining whether one or more non-comment code portions have been modified;
        determining whether an operation has changed from a first operation to a second operation;
        determining whether a variable has been changed from a first variable to a second variable;
        determining whether a functionality of the content has changed;
        determining whether a cosmetic change to the content has been made;
        determining whether a readability change to the content has been made;
        determining whether the edit includes pasting;
        determining whether the edit includes moving the content;
        determining an amount of AI assistance used;
        determining an amount of content editor assistance used;
        determining whether the content has been refactored;
        determining a number of characters changed by the edit;
        determining a number of words changed by the edit;
        determining a percentage of characters in the region changed by the edit;
        determining a percentage of words in the region changed by the edit;
        determining that the edit is to code functionality; and
        determining that the edit is to a portion of the content other than comments.

2. The computer-implemented method of claim 1, further comprising:
    determining that the author is human based on the edit being caused by receiving input over a human interface device of a computing environment associated with the content editor; and
    wherein the human interface device is a mouse, keyboard, touch screen, microphone, or motion controller.

3. The computer-implemented method of claim 1, wherein the content editor includes at least one of an integrated development environment, a text editor, or a plugin.

4. The computer-implemented method of claim 1, wherein the authorship token is a comment.

5. The computer-implemented method of claim 4, wherein the comment is predetermined and without respect to substance of the edit.

6. The computer-implemented method of claim 1, wherein the authorship token includes a feature configured to resist mimicry.

7. The computer-implemented method of claim 6, wherein the feature configured to resist mimicry includes:
    a cryptographic hash signed by a private key, wherein the cryptographic hash is of the edit or of the region; or
    a string within an exclude list of an artificial intelligence associated with the content editor.

8. The computer-implemented method of claim 1, storing a representation of the authorship token in a distributed ledger.

9. The computer-implemented method of claim 1, wherein the authorship token includes a portion of a creative work that is a continuation of a prior portion of a creative work part of a prior authorship token.

10. The computer-implemented method of claim 1, wherein providing the human authorship token in association with the region includes:
   inserting a comment in the content that has the authorship token, wherein the comment is inserted at a beginning of the region, an end of the region, or between the beginning and the end of the region; or
   inserting the human authorship token in a log associated with the region, wherein the log is a separate file from a file that contains the content.

11. The computer-implemented method of claim 1, further comprising:
   committing the file using a version control system that associates the commit with a user of the content editor, wherein the user is not the author.

12. The computer-implemented method of claim 1, further comprising:
   generating generated content using a generative artificial intelligence based on the content; and
   inserting the generated content into the content; and
   applying an artificial authorship token a portion of the content corresponding to the artificial content.

13. The computer-implemented method of claim 1, further comprising:
   identifying, within the content, one or more human regions based on presence of one or more human authorship tokens; and
   identifying one or more other regions lacking one or more human authorship tokens.

14. The computer-implemented method of claim 13, further comprising:
   providing the one or more human regions to an artificial intelligence for training; and
   resisting providing the one or more other regions as to the artificial intelligence for training.

15. The computer-implemented method of claim 13, further comprising
   generating a report identifying the one or more human regions of the content as having human authorship and identifying the one or more other regions of the content as lacking or potentially lacking human authorship.

16. The computer implemented computer-implemented method of claim 1, further comprising:
   determining moved content being imported into the content editor or exported from the content editor; and
   modifying the moved content based on authorship information of the moved content.

17. The computer-implemented method of claim 1, further comprising:
   determining that a region associated with a second edit is associated with a human authorship token; and
   responsive to determining that the region associated with the second edit is associated with the human authorship token, updating or preserving the human authorship token in association with the region.

18. A system for attributing authorship in content, the system comprising:
   a computer having one or more interfaces, processors, and memory,
   wherein the memory comprises:
      content editor instructions;
      generative artificial intelligence instructions; and
      authorship instructions; and
   wherein the authorship instructions, when executed by the one or more processors, cause the one or more processors to perform a method comprising:
      determining that an author made an edit to a region of content using a content editor, wherein the region is a line-level region, a lexical scope, a function-level region, a class-level region, a file-level region, a word-level region, a sentence-level region, or a paragraph-level region;
      determining that the edit satisfies a threshold of significance, wherein determining that the edit satisfies a threshold of significance includes determining that the edit is to code functionality or changes more than a predetermined threshold number of percentage of characters or words within a portion of the region of the content other than comments, including calculating a significance score and determining that the significance score satisfies a threshold; and
      responsive to determining that the edit satisfies the threshold of significance, providing an authorship token in association with the region, the authorship token having a predetermined form indicating that the author of the region is either (1) a human rather than an artificial intelligence or (2) an artificial intelligence rather than a human, wherein the predetermined form is based on whether the author is human or is an artificial intelligence,
   wherein calculating the significance score includes accounting for an output of the performance of one or more operations selected from the group consisting of:
      determining whether one or more comments have been modified;
      determining whether one or more non-comment code portions have been modified;
      determining whether an operation has changed from a first operation to a second operation;
      determining whether a variable has been changed from a first variable to a second variable;
      determining whether a functionality of the content has changed;
      determining whether a cosmetic change to the content has been made;
      determining whether a readability change to the content has been made;
      determining whether the edit includes pasting;
      determining whether the edit includes moving the content;
      determining an amount of AI assistance used;
      determining an amount of content editor assistance used;
      determining whether the content has been refactored;
      determining a number of characters changed by the edit;
      determining a number of words changed by the edit;
      determining a percentage of characters in the region changed by the edit;
      determining a percentage of words in the region changed by the edit;
      determining that the edit is to code functionality; and
      determining that the edit is to a portion of the content other than comments.

19. A non-transitory computer-readable storage medium storing computer-executable instructions thereon, which, when executed by a computing system, cause the computing system to perform a method of attributing authorship in content, the method comprising:

determining that an author made an edit to a region of content using a content editor, wherein the region is a line-level region, a lexical scope, a function-level region, a class-level region, a file-level region, a word-level region, a sentence-level region, or a paragraph-level region;

determining that the edit satisfies a threshold of significance, wherein determining that the edit satisfies a threshold of significance includes determining that the edit is to code functionality or changes more than a predetermined threshold number of percentage of characters or words within a portion of the region of the content other than comments, including calculating a significance score and determining that the significance score satisfies a threshold; and responsive to determining that the edit satisfies the threshold of significance, providing an authorship token in association with the region, the authorship token having a predetermined form indicating that the author of the region is either (1) a human rather than an artificial intelligence or (2) an artificial intelligence rather than a human, wherein the predetermined form is based on whether the author is human or is an artificial intelligence, wherein calculating the significance score includes accounting for an output of the performance of one or more operations selected from the group consisting of:
determining whether one or more comments have been modified;
determining whether one or more non-comment code portions have been modified;
determining whether an operation has changed from a first operation to a second operation;
determining whether a variable has been changed from a first variable to a second variable;
determining whether a functionality of the content has changed;
determining whether a cosmetic change to the content has been made;
determining whether a readability change to the content has been made;
determining whether the edit includes pasting;
determining whether the edit includes moving the content;
determining an amount of AI assistance used;
determining an amount of content editor assistance used;
determining whether the content has been refactored;
determining a number of characters changed by the edit;
determining a number of words changed by the edit;
determining a percentage of characters in the region changed by the edit;
determining a percentage of words in the region changed by the edit;
determining that the edit is to code functionality; and
determining that the edit is to a portion of the content other than comments.

* * * * *